Feb. 25, 1958 J. D. PETERSON 2,824,422
AIRCRAFT ENGINE CONTROL SYSTEM
Filed Oct. 30, 1944 10 Sheets-Sheet 3
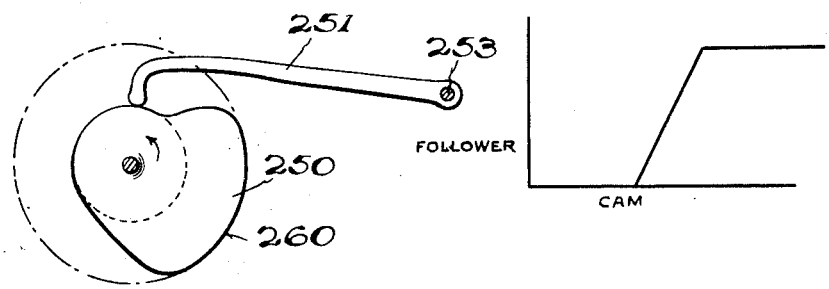
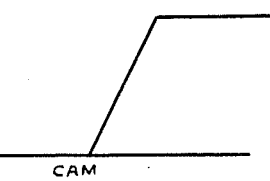
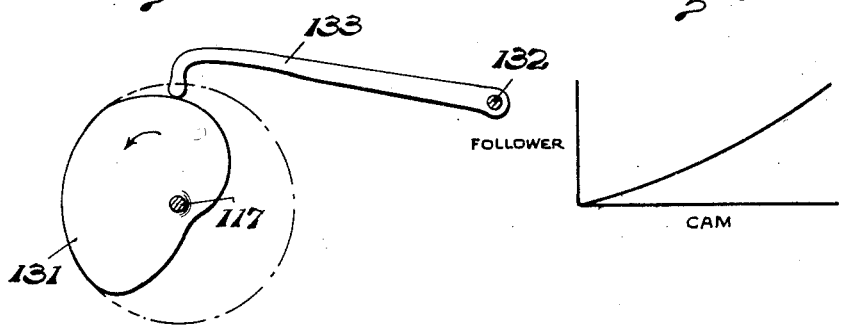
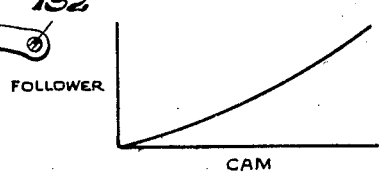
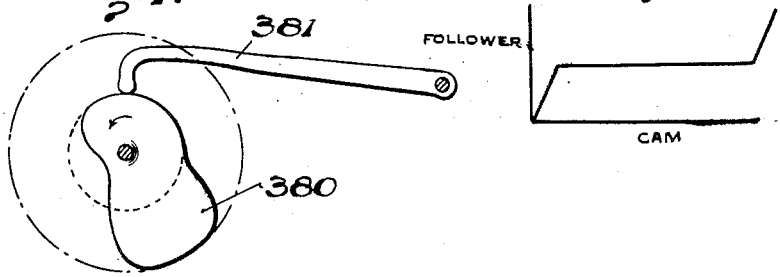
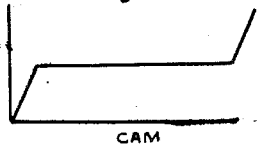
INVENTOR.
Joel D. Peterson.
BY
Herbert L. Davis, Jr.
ATTORNEY Feb. 25, 1958　　　J. D. PETERSON　　　2,824,422
AIRCRAFT ENGINE CONTROL SYSTEM
Filed Oct. 30, 1944　　　　　　　　　　　　　10 Sheets-Sheet 4
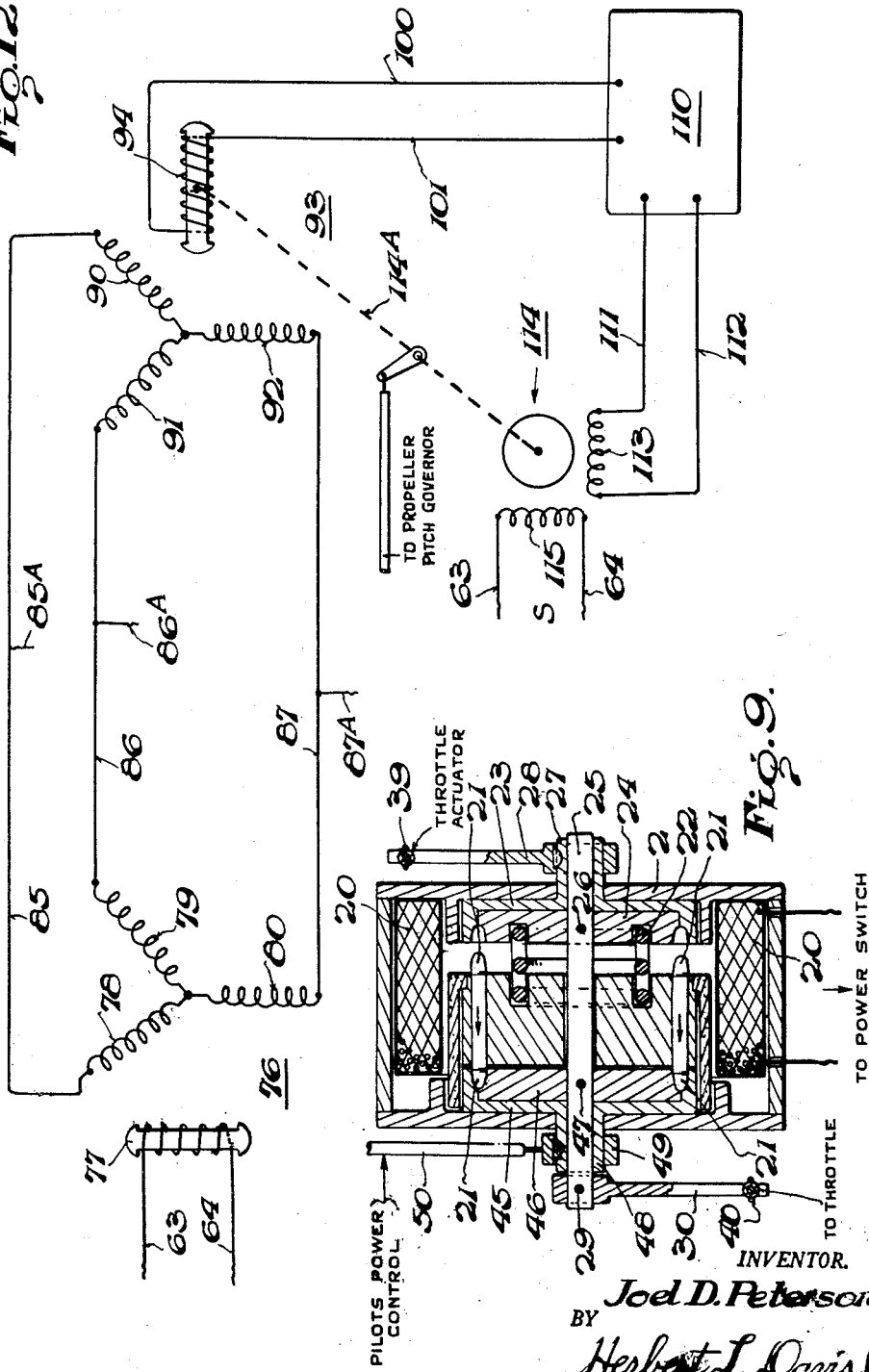
INVENTOR.
Joel D. Peterson.
BY
Herbert L. Davis Jr.
ATTORNEY Inventor
Joel D. Peterson.
By Herbert L. Davis, Jr.
Attorney

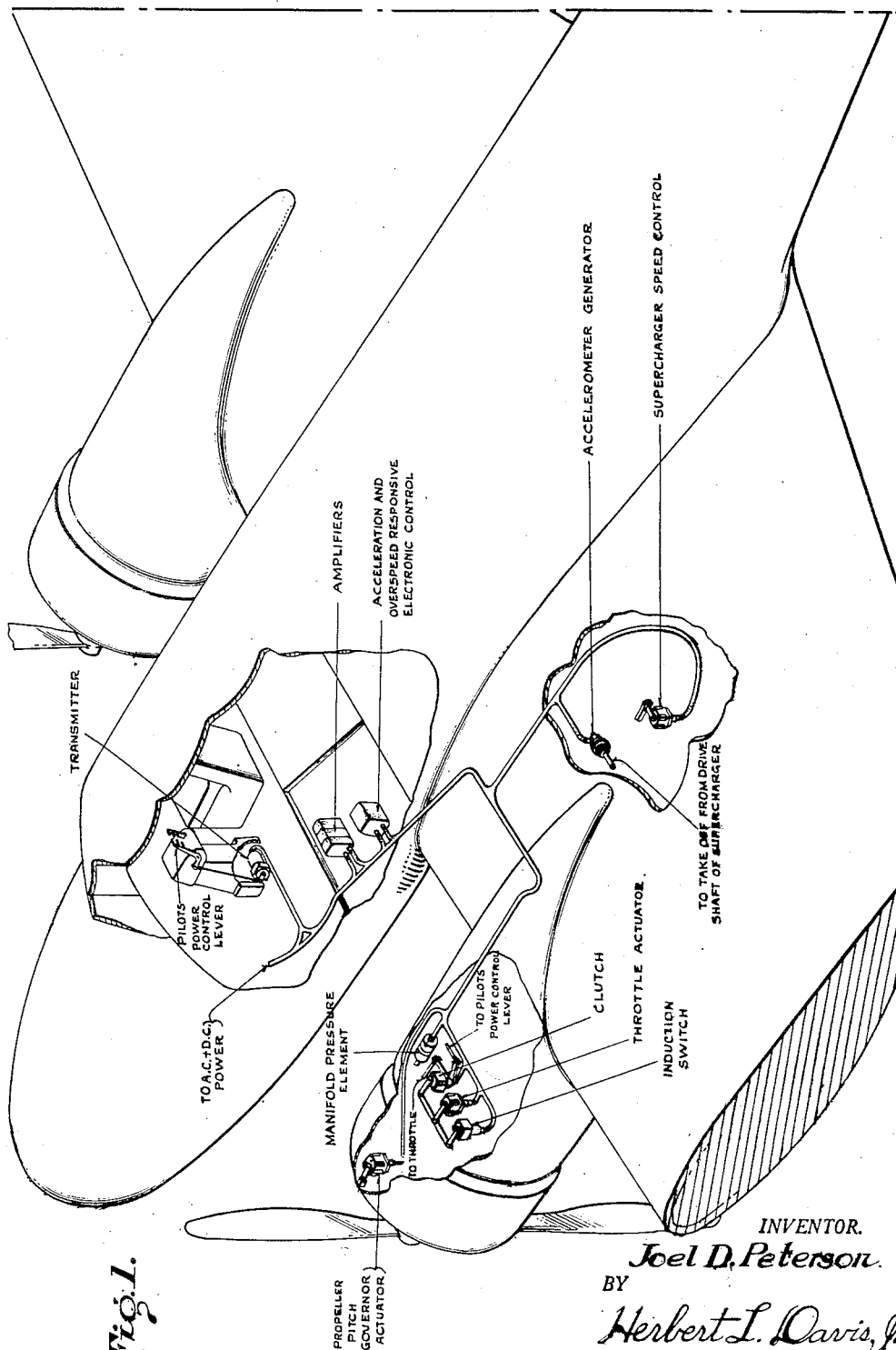

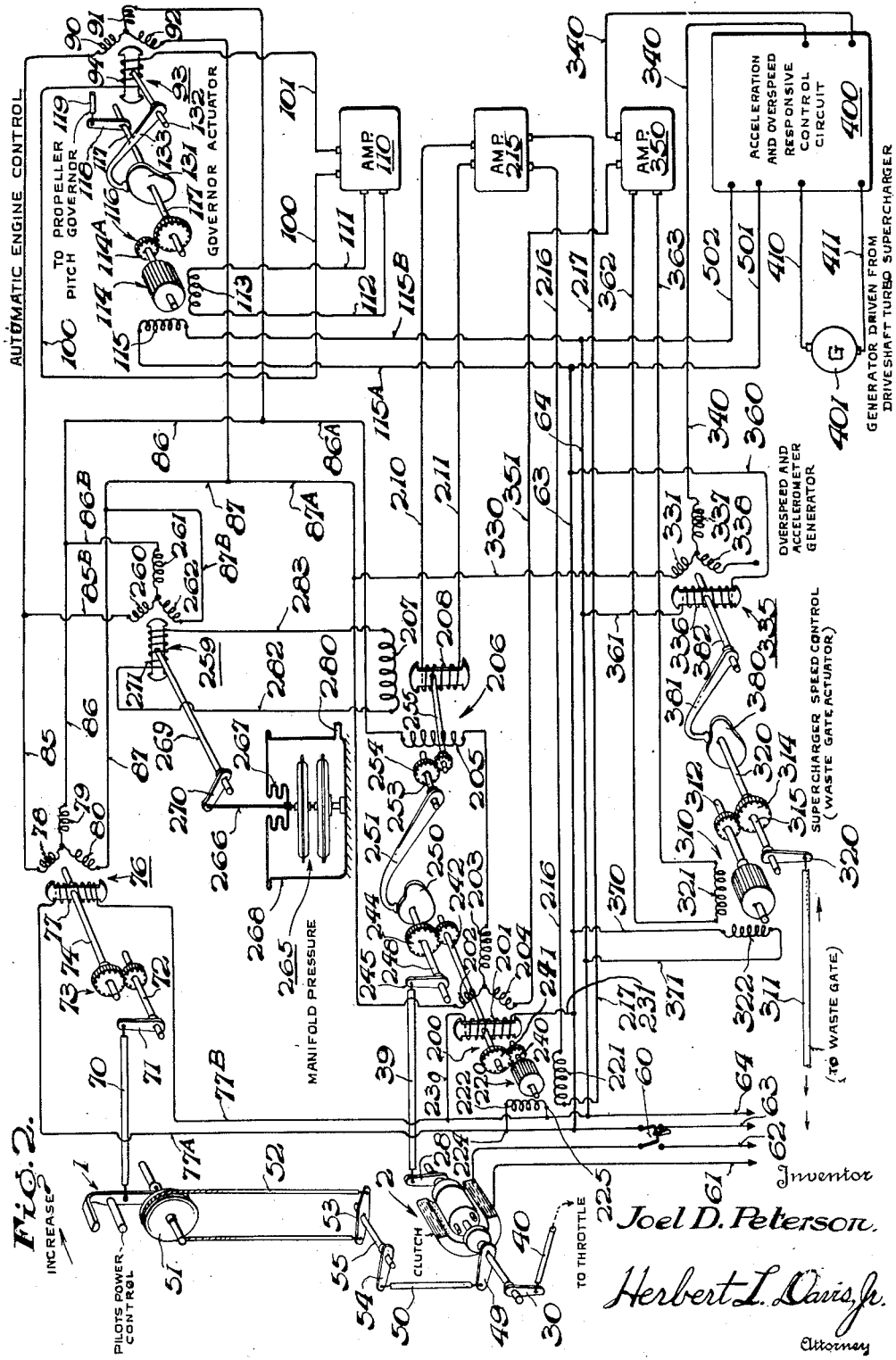

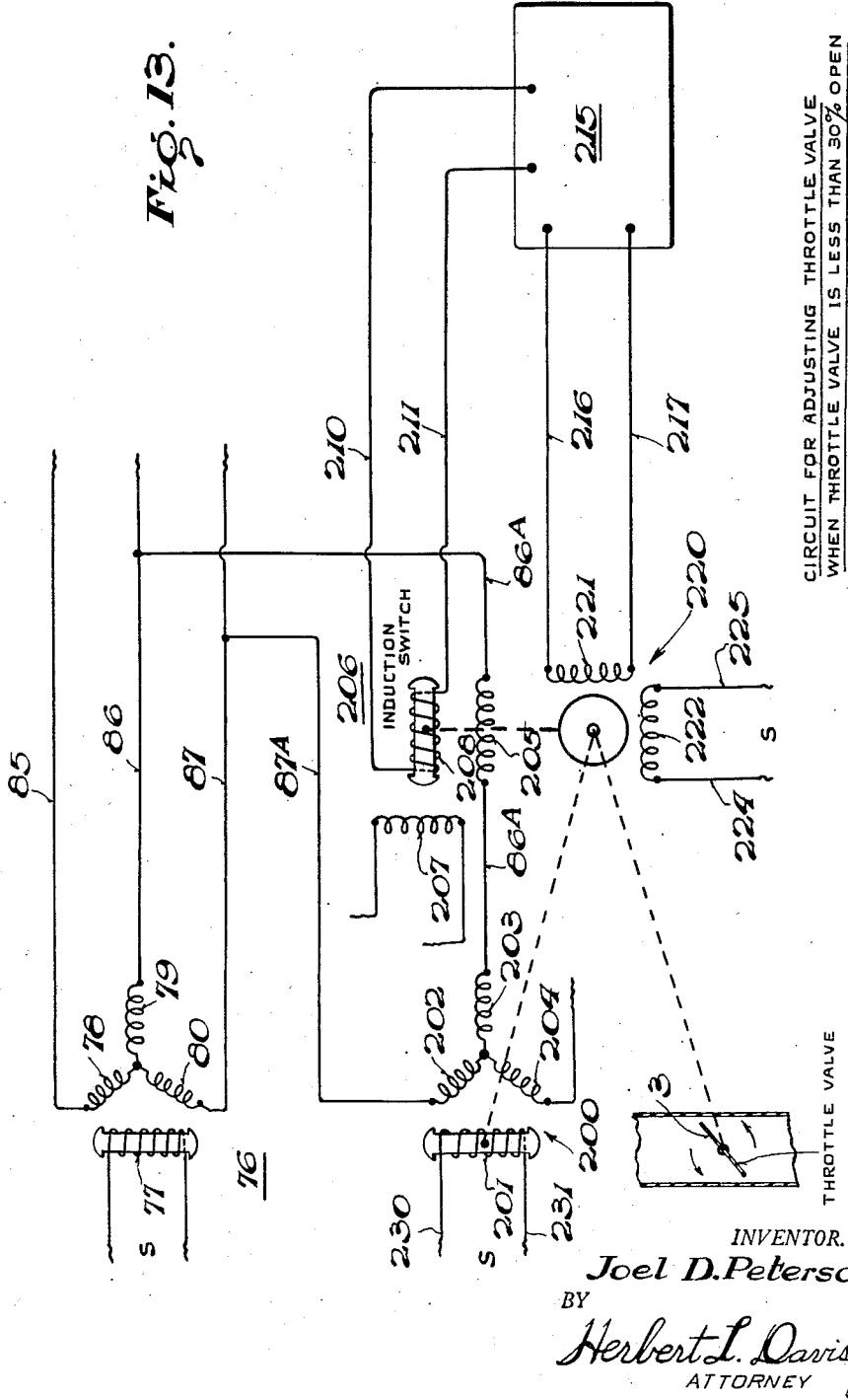

Feb. 25, 1958  J. D. PETERSON  2,824,422
AIRCRAFT ENGINE CONTROL SYSTEM
Filed Oct. 30, 1944  10 Sheets-Sheet 8
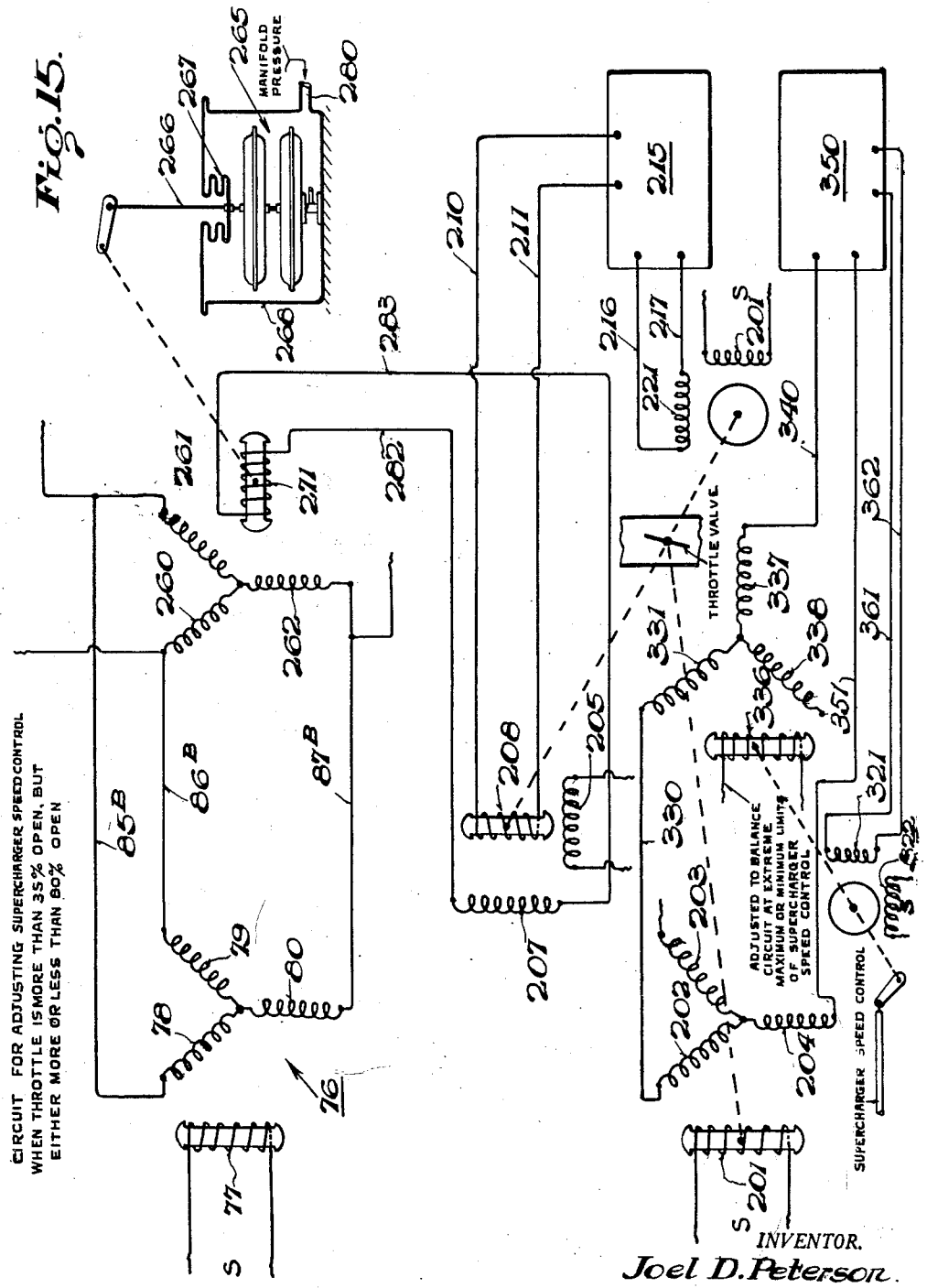
INVENTOR.
Joel D. Peterson
BY
Herbert L. Davis, Jr.
ATTORNEY

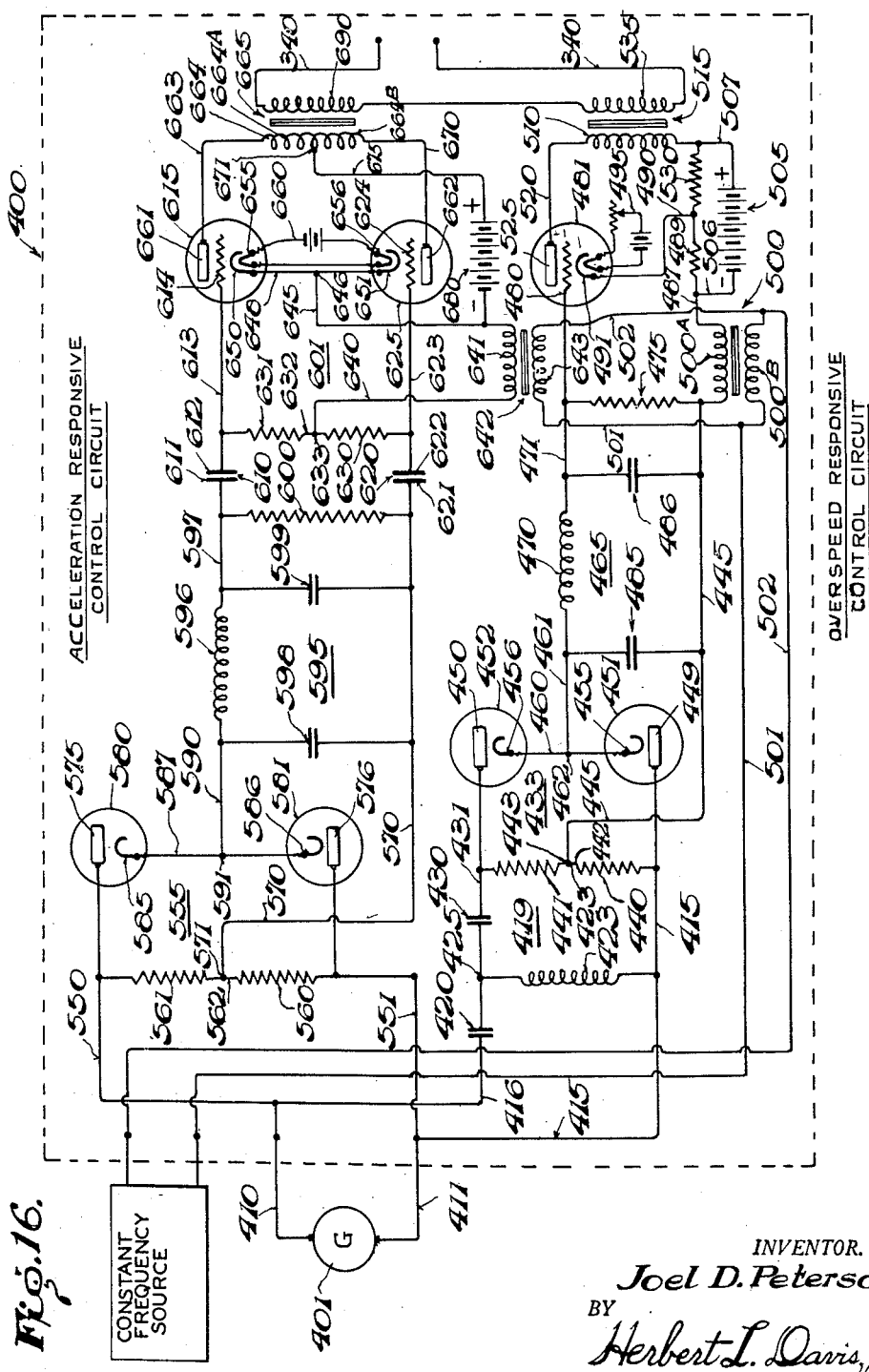

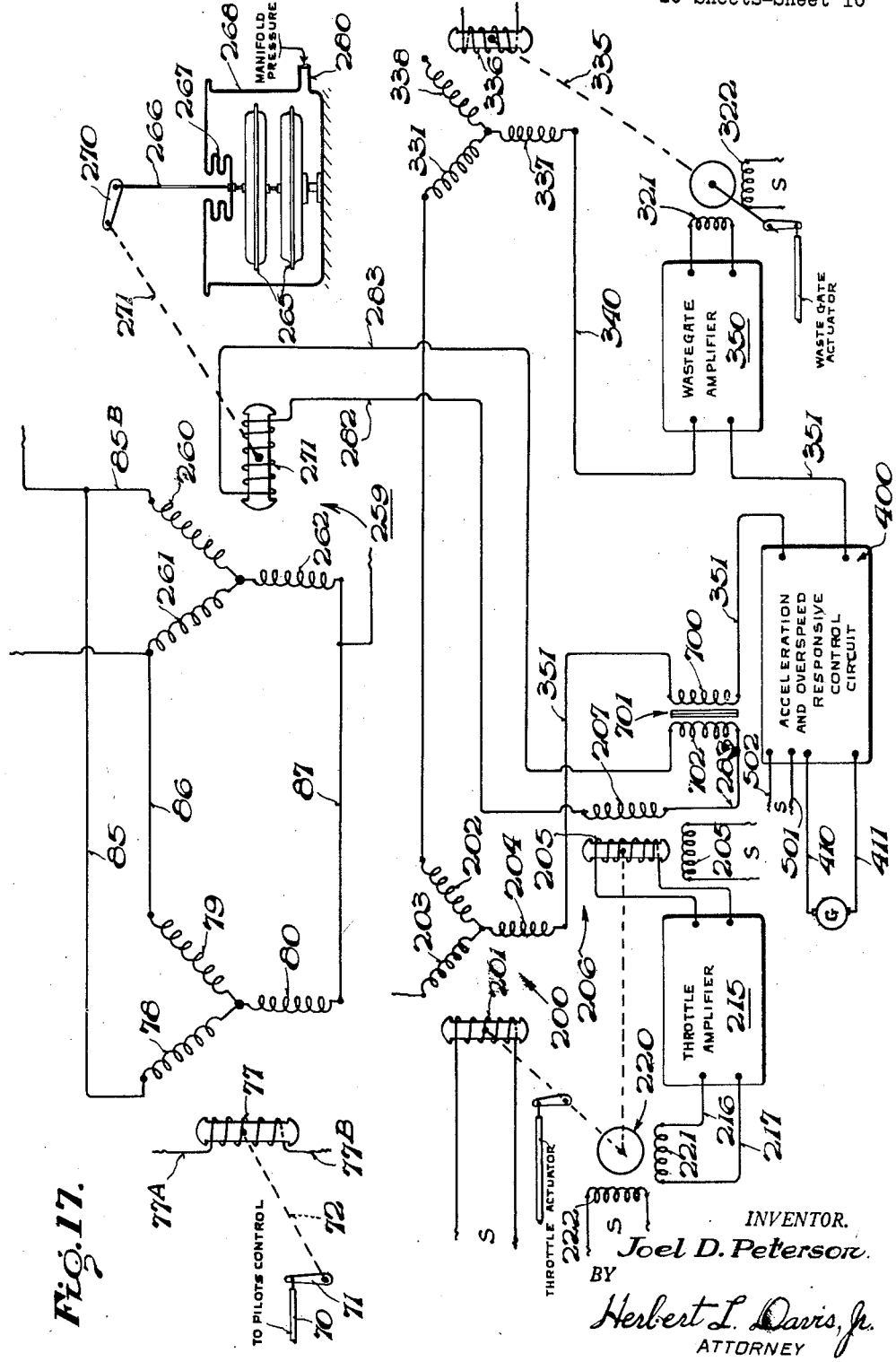

United States Patent Office 2,824,422
Patented Feb. 25, 1958

2,824,422

AIRCRAFT ENGINE CONTROL SYSTEM

Joel D. Peterson, Ridgewood, N. J., assignor to Bendix Aviation Corporation, Teterboro, N. J., a corporation of Delaware Application October 30, 1944, Serial No. 561,083

44 Claims. (Cl. 60—13)

The present invention relates to control systems and apparatus for the power units of aircraft, particularly of the supercharged internal combustion engine type arranged for driving an automatically controlled variable pitch propeller.

With present aircraft supercharged engines the best performance is maintained only by adjustment of the various functions of the engine to values consistent with efficient and safe operation of the engine, with proper compensation for external factors such as the atmospheric pressure surrounding the aircraft, which pressure is directly affected by changes in the altitude of the aircraft. The functions of the power unit controlled are engine manifold pressure and engine speed. The manifold pressure is regulated through control of an induction throttle valve and the driving speed of the supercharger, while the engine speed is regulated usually by varying the pitch of the aircraft propeller through a propeller pitch governor control.

Heretofore in order to control the throttle valve, the supercharger and the means for governing the pitch of the propeller, there have been provided separate actuators and such actuators have included a plurality of separate operating levers for each actuator and have included a labyrinth of linkage subject to wear and requiring constant care and adjustment.

Accordingly, an object of the present invention is to provide a single lever for controlling all of the several actuators for each aircraft engine and also to reduce the operating linkage of each of the several control actuators to minimum.

Another object is to provide a novel electrical system of engine control.

Another object is to provide a novel remote engine control system, whereby no mechanical control connections between the pilot's position and the engine nacelle are required.

Another object is to provide in a control system, a master transmitter controlled by a single lever in which the angular position thereof is proportional to predetermined manifold pressure values, whereby the manifold pressure values selected by the pilot by positioning the transmitter will automatically be maintained within the performance range of the engine.

Another object is to provide a novel pilot controlled follow-up system for controlling the engine throttle for a selected value of manifold pressure at relatively low altitudes not requiring engine supercharging, in combination with a novel automatic follow-up means responsive to manifold pressure for maintaining the pilot selected values of manifold pressure at relatively higher altitudes through regulation of the driving speed of the supercharger.

Another object is to provide in combination two systems of engine throttle control, whereby one system controls the throttle angle as a direct function of the position of the pilot's control lever and a second system arranged to automatically override a first system at a predetermined position of the throttle so as to automatically control the throttle angle as a function of the engine manifold pressure and thereby maintain a selected engine manifold pressure.

Another object is to provide novel electrical induction means for changing over from the first to the second system.

Another object is to provide a third system for controlling the driving speed of an engine supercharger so as to regulate the intake manifold pressure, the supercharger being controlled by the position of the throttle, when the second system is in operation, so as to cooperate with the second system in maintaining the selected manifold pressure.

Another object is to provide a fourth system for regulating a propeller pitch governor directly controlled by the position of the pilot's lever so that each adjusted position of the lever will effect a corresponding definite adjustment of the propeller pitch governor and upon operation of the second system aforenoted, each adjusted angular position of the pilot's control lever will effect a definite selected manifold pressure and adjustment of the propeller pitch governor.

Another object is to provide novel acceleration responsive means for preventing the sudden acceleration or deceleration of the supercharger speed and permitting only gradual change in the speed of the supercharger in response to increased or decreased manifold pressure requirements so as to provide stability to the system.

Another object of the invention is to provide novel means changing the rate of permissible acceleration and deceleration in direct relation to the difference between the selected pressure and actual intake manifold pressure so that the rate of pressure build up will decrease as the actual pressure approaches the selected value. A higher rate sensitivity for the system is thus allowable for better stability since in effect, the rate sensitivity is decreased at larger pressure differences.

Another object is to provide novel overspeed responsive means for limiting the driving speed of the supercharger to within a safe operating range.

Another object is to provide novel overspeed and acceleration responsive generator means for stabilizing the driving speed of the supercharger.

Another object is to provide a novel means whereby the throttle may be selectively controlled either directly from the pilot's control lever or through the automatic control means.

Another object is to provide novel electrical means whereby upon power failure the throttle will be automatically returned to manual operation.

Another object of the invention is to provide novel means for maintaining the intake manifold pressure of an aircraft engine at a selected value, whereby the pressure may be regulated first by the positioning of an induction throttle valve to a predetermined open null position, and thereafter by adjusting the driving speed of a supercharger within its operating limits to effect further regulation of the intake manifold pressure upon the positioning of the throttle valve to either side of the null position. Thus, upon opening the throttle valve past its null position the speed of the supercharger will be progressively increased to its maximum limit or to a driving speed which will be maintained upon the throttle valve being returned to the null position. Likewise upon the induction throttle valve being moved from said null position in a direction for closing said valve the speed of the supercharger will be progressively decreased to its minimum limit or to a driving speed which will be maintained upon the induction throttle valve being returned to the null position.

Yet a further object of the present invention is to provide an electrical system, wherein all forms of pick-up and switching are inductive so as to eliminate relays, contacts, brushes and other like elements subject to wear and frequent replacement.

Another object is to design a novel engine control system wherein efficiency, simplicity, economy and durability are combined to give the most favorable performance practicable during flight.

The above and other objects and advantages of the present invention will appear more fully hereinafter from a consideration of the detailed description which follows, taken together with the accompanying drawings wherein the features of the present invention are illustrated. It is to be expressly understood, however, that the drawings are for the purpose of illustration only and are not designed as a definition of the limits of the invention.

In the drawings wherein like reference characters refer to like parts throughout the several views:

Figure 1 is a fragmentary plan view of an aircraft with certain portions broken away so as to illustrate diagrammatically the relative positions of the several operating parts and conduits carrying the electrical connections of one form of the novel control system.

Figure 2 is a diagrammatic illustration of a form of the novel electrical control system.

Figure 3 is an enlarged side elevational view of the induction switch operating cam and follower shown in Figure 2.

Figure 4 is a diagram illustration of the movement imparted to the cam follower by the cam of Figure 3.

Figure 5 is an enlarged side elevational view of the propeller pitch governor actuator cam and follower shown in Figure 2.

Figure 6 is a diagram illustration of the movement imparted to the cam follower by the cam of Figure 5.

Figure 7 is a side elevational view of the supercharger speed control limiting cam and follower shown in Figure 2.

Figure 8 is a diagram illustration of the movement imparted to the cam follower by the cam of Figure 7.

Figure 9 is an enlarged sectional view of the clutch of Figure 2 showing the same in a de-energized position, whereby the engine induction throttle may be directly controlled by manual operation of the pilot's power control lever.

Figure 12 is a diagrammatic view of the portion of the electrical control circuit of Figure 2 for controlling the propeller pitch governor in response to adjustment of the pilot's control lever.

Figure 13 is a diagrammatic view of the portion of the electrical control circuit of Figure 2 for adjusting the induction throttle valve when the valve is less than thirty percent open.

Figure 15 is a diagrammatic view of the portion of the electrical control circuit of Figure 2 for adjusting the supercharger speed control when the induction throttle valve is more than thirty-five percent open, but either more or less than the predetermined null position of approximately eighty percent open.

Figure 16 is a diagrammatic view of the acceleration and overspeed responsive control circuit.

Figure 17 is a diagrammatic view of a modified form of the novel electrical control system.

Figure 10:
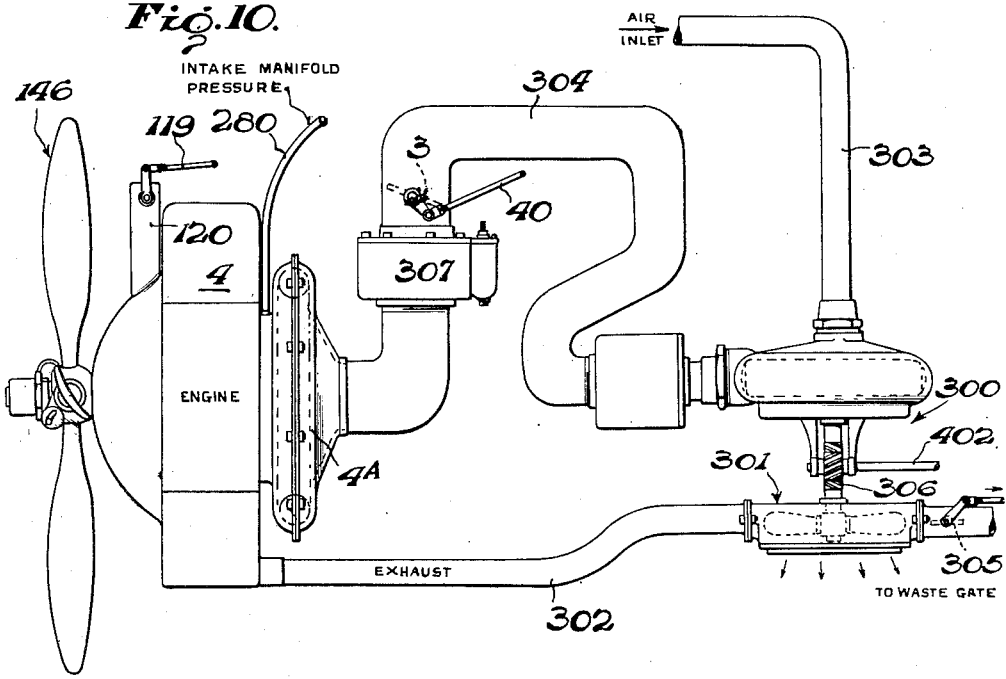
Figure 10 is a schematic view of an engine system which may be controlled by the novel control system.

Referring in detail to the electric control system of Figures 2 and 10, there is provided a single control lever 1 and a compound clutch 2, whereby an induction throttle valve 3 of an aircraft engine 4 may be selectively connected either to an automatic control system herein provided or directly to the control lever 1 for manual operation.

The clutch 2 may be of any suitable type, but as shown in detail in Figure 9, includes an electromagnet 20 which when energized biases clutch pins 21 against biasing force of a spring 22 into engaging relation with a clutch plate 23 and 24. The clutch plate 24 is fastened to a shaft 25 by a pin 26, while clutch plate 23 is normally rotatably mounted on the shaft 25 and has a sleeve 27 to which there is splined an arm 28 as shown in Figure 2.

Thus upon the electromagnet 20 being energized the clutch plates 23 and 24 are drivingly connected and thus operatively connecting the arms 28 and 30, as shown in Figure 2.

The arm 28, as shown in Figure 2, is operably connected through a rod 39 to the automatic control mechanism, while the arm 30 is connected through a rod 40 to the throttle control valve 3. Thus upon energization of the electromagnet 20, the throttle control valve 3 is operably connected to the control system through the arms 28 and 30.

When the electromagnet 20 is de-energized the spring 22 biases the clutch pins 21 out of engaging relation with clutch plates 23 and 24 and into engaging relation with a second set of clutch plates 45 and 46 so as to disconnect the arm 28 from driving relation with the arm 30. The plate 46 is connected to the shaft 25 through a pin 47, while the plate 45 is normally rotatably mounted on the shaft 25 and has a sleeve 48 to which there is splined an arm 49 so that the arm 49 is connected by a rod 50 to the pilot's throttle control lever 1 through pulley 51, cable 52, lever 53, shaft 55 and arm 54.

Thus upon de-energization of the electromagnet 20 the clutch plates 45 and 46 are drivingly connected through operation of the spring 22, whereupon the arms 49 and 30 are operably connected. As previously explained, the arm 30 is connected through rod 40 to the induction throttle valve 3, as shown in Figure 10.

Thus when the clutch 2 is de-energized the automatic electrical control system is inoperative and the induction throttle valve 3 may be manually adjusted through operation of the pilot's control lever 1. A double pole switch 60 is provided to energize or de-energize the automatic control system simultaneously with the electromagnet 20 through electrical conductors 61, 62, 63 and 64 so that the induction throttle valve 3 may be automatically or manually controlled as desired. Moreover, it will be readily seen that as a safety provision upon a power failure the system will be automatically transferred by the de-energization of the electromagnet 20 of the clutch 2 to manual operation.

The pilot's throttle control lever 1 is further suitably connected so as to effect selective electrical control of the automatic electrical control system. Thus the lever 1 is connected by an actuator rod 70 to an arm 71, which is operably connected through a shaft 72, a gear train 73, and shaft 74 to rotor 77 of an electrical induction type transmitter or transformer 76. The gear train 73 is provided of suitable ratio, such as for example, two to one.

The transmitter 76 as illustrated hereinafter, comprises the rotor winding 77 which may be angularly displaced in relation to stator windings 78, 79 and 80 by the control lever 1, and the rotor winding 77 is arranged in inductive relation with the stator windings. Voltage is applied to the rotor winding 77 through electrical conductors 77A and 77B connected to conductors 63 and 64 leading from a suitable source of alternating current. Angular displacement of the transmitter rotor winding 77 causes the voltage applied to the rotor winding 77 to induce varying voltages in the stator windings 78, 79 and 80 of the transmitter 76 depending upon the relative position of the rotor winding 77. The voltages thus induced in the stator windings of the transmitter are applied through conductors 85, 86 and 87 to the stator windings 90, 91 and 92 of the propeller pitch governor actuator follow-up transformer or receiver 93. The latter system is shown in combination with the other features of the control system in Figure 2 and separately in Figure 12.

*Propeller pitch governor control*

Rotatably mounted within the stator windings 90, 91 and 92 and in inductive relation therewith, is a rotor winding 94. If the winding 94 is not in a position in relation to the stator windings 90, 91 and 92 corresponding to a position at right angles to the induced field or the relative position of the rotor winding 77 to the stator windings 78, 79 and 80 there will be induced into the rotor winding 94 a voltage. The rotor winding 94 is connected through electrical conductors 100 and 101 to the input of an amplifier 110. The voltage induced into the winding 94 will cause an alternating current to flow to the amplifier 110, which is in phase or in phase opposition with the alternating current flow supplied through the conductors 63 and 64, depending upon the direction of the difference in the position of the rotors 77 and 94.

The amplifier 110 may be of any suitable type of torque amplifier well known in the art, or may be an amplifier of a type such as shown, for example, in the expired Patent No. 1,586,233 dated May 15, 1926 and granted to H. Anschutz-Kaempfe. Electrical conductors 111 and 112 lead from the output of the amplifier 110 to a secondary or auxiliary winding 113 of a two-phase motor 114. A main winding 115 is connected through electrical conductors 115A and 115B which are connected to conductors 63 and 64 leading to the same alternating current source as the transmitter rotor winding 77.

Thus if the rotor windings 77 and 94 are set in such a manner in relation to the stator windings that no voltage is induced into the winding 94 no current will flow in the auxiliary motor winding 113 of the two-phase motor 114 for there would be no alternating current flowing in the input circuit 100 and 101 of the amplifying unit 110. The motor 114 will therefore not operate for there is no rotating field.

When the rotor windings 77 and 94 are positioned at different angular relations to the stator windings from the null position, a voltage will be impressed on the winding 94, that is to say on the input circuit 100 and 101 of the amplifier 110, and the said voltage will be in phase or in phase opposition with the voltage supplied through the conductors 63 and 64.

The amplified current which flows in the auxiliary winding 113, will thus produce a corresponding field. Provision is further made in the amplifier 110, in a manner for example such as shown in the patent previously noted to H. Anschutz-Kaempfe, whereby the said auxiliary current or auxiliary field will have a phase displacement or difference of 90 degrees relative to the main current or main field, so that said fields form together a rotating field of sufficient magnitude to start the motor 114. It will depend on the phase direction of the alternating current voltage at the input of the amplifier 110 whether the auxiliary field will be displaced 90 degrees relative to the main field in the forward or backward direction or in other words, the direction or rotation of the rotating field will depend upon the direction of angular variation of the rotor winding 77 and 94.

The motor 114 is so arranged that if the receiver rotor 94 is not in a position corresponding to the null position for that of the transmitter rotor 77 an electrical signal is applied to the amplifier 110 which will feed power to the motor 114 to cause rotation of the receiver rotor 94 through a shaft 114A and interconnecting mechanical means, as will be explained, so as to bring the receiver rotor 94 to a position corresponding to the null position for the position of the transmitter rotor 77, whereupon the signal of the input circuit of the amplifier 110 will cease and rotation of the motor 114 terminate.

Figure 11:
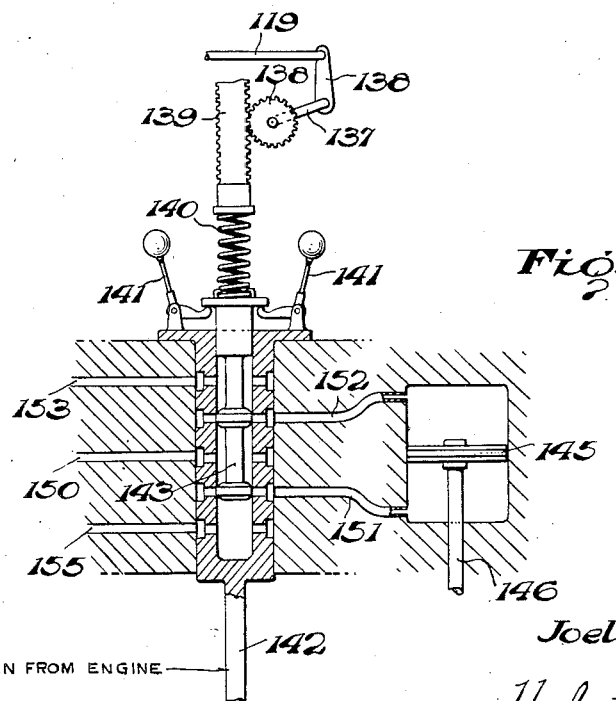
Figure 11 is a schematic view of a propeller control mechanism of a type such as may be controlled by the hereinafter described system.

The rotor of the motor 114 is connected by the shaft 114A through a suitable gear train 116 and shaft 117 to an arm 118 to which is connected a rod 119 leading to a suitable propeller pitch governor control indicated generally by the numeral 120 and shown schematically in Figure 11.

The rotor winding 94 follows up or measures for each corresponding change of position of the transmitter, the setting of the propeller pitch governor 120. The governor 120 is actuated by the follow-up motor 114, and its ratio of movement is controlled by reduction gear train 116 and a cam 131, see Figures 2, 5 and 6 to thereby position the follow-up rotor winding 94 of the receiver 93 shown in Figure 2, so as to maintain proper relationship between the engine speed and manifold pressure, as will be explained. To provide for this ratio of performance there is provided a rotor shaft 132 on which is mounted a follower 133 which may be biased under suitable spring means not shown, into contacting relation with the cam surface of cam 131. The follower 133 is arranged to position the receiver rotor winding 94 through the motor 114 and cam 131 according to the movement of the pilot's control lever 1, until the position of the rotor 94 agrees with that of the transmitter rotor 77. Referring to Figures 5 and 6, the cam 131 is so shaped as to provide surfaces for contact with the follower 133 from its axis of rotation.

Thus cam 131 provides a non-lineal continuous smooth curve of actuation for the governor 120, as shown in Figure 8, which co-acts with the selected position of the transmitter 76 to maintain proper speed relationships of the engine to those selected by the pilot.

Thus, as in the other follow-up motor arrangements of the several actuators hereinafter to be described, the rotor two-phase motor 114 in the governor actuator is energized and angularly positioned according to a selected position of the master transmitter 76 to thereby actuate rod 119 through lever 118 mounted on cam shaft 117, until rotor 94 of the governor follow-up transformer 93 is angularly shifted to a null position for no voltage output to amplifier 110.

The rod 119 is connected to a propeller pitch governor control 120 which may be of any suitable type well known in the art. The same is shown in Figure 11 as being of a type having a lever and a suitable shaft 137, gear 138 and rack 139 for adjusting the governor spring 140 and fly-weight governor 141. The fly-weight governor 141 is mounted at one end of a shaft 142 drivingly connected through suitable gear means, not shown, to a drive shaft of the aircraft engine 4, which engine is controlled through the system hereinafter described.

Slidably mounted in the shaft 142 is a valve 143 adjustably positioned under tension of the spring 140 and the counter-acting biasing force of the centrifugally actuated fly-weights 141. The valve 143 controls the operation of the piston 145, which controls the pitch of a propeller 146 driven by the engine 4. Thus the engine speed may be controlled by varying through the operating rod 119 the tension of governor spring 140 and the resultant position of the pilot valve 143 and piston 145.

The piston 145 operates a rod 146 arranged in any suitable manner well known in the art to control the pitch of the aircraft propeller.

The rod 146 may have a rack, not shown, at its extremity in connection with a gear train, not shown, for varying the pitch of the propeller 146 in a conventional manner. The propeller pitch control is so arranged that by increasing the tension exerted by the spring 140 the valve 143 will be adjusted from a neutral position so as to connect fluid inlet port 150 to port 151 leading to one side of piston 145 and opening port 152 leading from the opposite side of the piston 145 to fluid outlet port 153. Movement of the piston 145 will then be effected to decrease the pitch of the propeller 146 and thereby increase the driven speed of the propeller until the centrifugal forces acting upon the fly-weights 141 is sufficient to return the valve 143 to a neutral position.

Conversely by decreasing the tension exerted by the spring 140 on the valve 143, the centrifugal forces acting upon the fly-weights 141 will cause the valve 143 to be adjusted in an opposite direction from the neutral position so as to open the port 152 to the fluid inlet port 150 and the port 151 to the outlet port 155, thus effecting movement of the piston in an opposite direction and causing an increase in the adjustment of the pitch of the propeller so as to decrease the driven speed of the propeller until the centrifugal force acting upon the fly-weights 141 is decreased sufficiently so that the tension of the spring 140 will return the valve 143 to a neutral position.

Thus by increasing the tension of the spring 140 the speed of the engine increases, while upon a decrease in the tension of the spring 140 the speed of the engine decreases.

In the operation of the automatic means it will be readily seen that as the control lever 1 is moved in a clockwise direction for increasing the speed of the engine rotor 77 will be moved in a counter-clockwise direction causing motor 114 to effect movement of rotor 94 in a corresponding direction through rotation of cam 131 in a counter-clockwise direction effecting movement of follower arm 133 under spring tension in a similar direction until the null position is reached for the rotor 94, whereupon operation of the motor 114 is terminated.

Such operation of the motor 114 also effects through shaft 117 a counter-clockwise movement of the arm 118 effecting through the rod 119 a counter-clockwise movement of the arm 139 and thus effecting an increase in the biasing force exerted by the spring 140 and causing as previously explained a decrease in the pitch of the propeller, whereupon the speed of the engine 4 may be increased. An opposite effect will of course be produced upon moving lever 1 in a counter-clockwise direction.

*Throttle actuator*

In addition to operating the propeller pitch governor control the positioning of the rotor 77 also controls the position of the induction throttle valve 3 which regulates the induction pressure of the engine 4 as will be explained.

As shown in Figures 2 and 13, there is provided a second receiver 200 which has a rotor winding 201 and stator windings 202, 203, and 204. The stator winding 202 is connected through electrical conductors 87A and 87 to the stator winding 80 of the transmitter 76, while the stator winding 203 is connected through electrical conductors 86A and 86 to the stator winding 79 of the transmitter 76. A high impedance inductive winding 205 is provided in the conductor 86A and the winding 205 forms one stator winding of an induction switch 206.

The induction switch 206 has a second inductive stator winding 207 which is preferably positioned at right angles to the inductive winding 205 so that when a rotor winding 208 of the induction switch 206 is positioned at right angles to the winding 207, as shown in Figure 2, the winding 208 will be inductively coupled with the winding 205 and there will be no inductive coupling between the winding 208 and winding 207. However, when the rotor winding 208 is positioned at right angles to the winding 205 the winding 208 will be inductively coupled to the winding 207 and there will be no inductive coupling between the winding 208 and the winding 205.

The rotor winding 208 is connected by electrical conductors 210 and 211 to the input of an amplifier 215 of similar type to the amplifier 119 previously described. The amplifier 215 has output conductors 216 and 217 in which is inserted one of the two windings of two-phase motor 220 and which winding will be hereinafter described as secondary winding 221. The main winding 222 is connected through electrical conductors 224 and 225 to the alternating current conducted through conductors 63 and 64. The rotor winding 201 of the receiver 200 is connected through electrical conductors 230 and 231 with said source of alternating current and is rotatably positioned in relation to said stator windings 202, 203 and 204 by said motor 220, as will be explained.

As best shown in Figure 13, the stator windings 79 and 80 of the transmitter 76 together with the electrical conductors 86, 87, 86A, 87A, stator winding 205 of induction switch 206 and stator windings 202 and 203 of the receiver 200 provide a closed circuit.

There is induced in this closed circuit through the alternating current flowing in the rotor winding 77 a first voltage and through the alternating current flowing in the winding 201 a second voltage which tends to oppose the first voltage. If the rotor winding 77 be positioned at a different angular relation to the stator windings 79 and 80 than the rotor winding 201 is positioned in relation to the stator windings 202 and 203, it will be readily seen that a greater or less voltage will be induced in the closed circuit by the one than by the other. The difference between these induced voltages will effect a current flow through the high impedance windings 205.

Thus in the event the rotor inductive winding 208 of the switch 205 is positioned in inductive relation to the stator winding 205 as shown in Figure 13, a corresponding voltage will be induced in the winding 208, which upon amplification by the amplifier 215 will cause an alternating current flow in the auxiliary winding 221 of the two-phase motor 220; such current flow will have a phase displacement or difference of ninety degrees relative to the main winding 222, so as to effect rotation of the motor 220. The direction of rotation of the rotating field will depend upon whether the voltage induced into the closed circuit by one or the other of the rotor windings 77 or 201 be greater; the motor 220 being so arranged as to move the rotor winding 201 in a direction relative to the stator windings 202 and 203 so as to cause the voltages induced into the said circuit to equalize, whereupon no current will flow in the winding 205 and rotation of the motor 220 will terminate. The motor 220 drives the rotor winding 201 through a suitable driving means including shaft 240 and reduction gearing 241. The motor 220 also drives through shaft 242, gear train 244, shaft 248 and arm 245, which is connected through rod 39 to the arm 28 of the electromagnetically operated clutch 2. The motor 220 upon energization of electromagnet 20 of clutch 2 controls the position of the induction throttle valve 3. The motor 220 also drives through shaft 248, a cam 250.

An arm 251 rides in contacting relation along the cam surface of the cam 250 under suitable biasing means, such as a spring tension means, not shown. The arm 251 is drivingly connected through a shaft 253, suitable gear train 254, and shaft 255 to the rotor 208 of the induction switch 206 so that upon rotation of cam 250 to a position where the arm 251 rides on raised portions 260 of the cam 250, the rotor 208 will be shifted to a position at right angles to the winding 205 and in inductive relation to winding 207.

It will be readily seen, that with the rotor 208 of the induction switch 206 positioned in relation to the winding 205, as shown in Figure 13, the motor 220 effects a motion follow-up of the position of the transmitter rotor 77. Thus movement of the rotor 77, in a counter-clockwise direction, will effect a corresponding follow-up clockwise movement of the winding 201 and counter-clockwise movement of the cam 250 until a shifting of the induction switch rotor winding 208 in response to movement of the control lever 1 is effected so as to place the winding 208 in non-inductive relation with the winding 205 and in inductive relation with the winding 207. Such counter-clockwise movement of the cam 250 will of course effect a corresponding counter-clockwise movement of the arm 245 affixed to the shaft 248 so as to progressively open the throttle valve 3, through rod 39, arm 28, clutch 2, arm 30 and rod 40.

The cam 250 is so arranged that the direct motion follow-up of the rotor 77 is effected for a predetermined range of movement of the throttle valve 3, such as for example from full closed position to thirty percent open throttle position. At the latter predetermined position, the cam 250 will begin shifting the induction switch rotor winding 208 to a position out of inductive relation with winding 205 and into inductive relation with winding 207. This action may take place for a predetermined range of movement of the throttle valve 3, for example from thirty percent to thirty-five percent open position of the throttle valve 3.

Manifold pressure control

Upon the rotor winding 208 being shifted to a position in inductive relation with the winding 207 the control of the throttle 3 shifts from a motion follow-up to a manifold pressure follow-up.

The manifold pressure control as best shown in Figure 2, includes a receiver transformer 259 having the stator windings 260, 261 and 262 which are connected in parallel with the transmitter stator windings 78, 79 and 80 and the receiver transformer 93, stator windings 90, 91 and 92 through electrical conductors 85B, 86B and 87B connected respectively to the conductors 85, 86 and 87.

Figure 14:
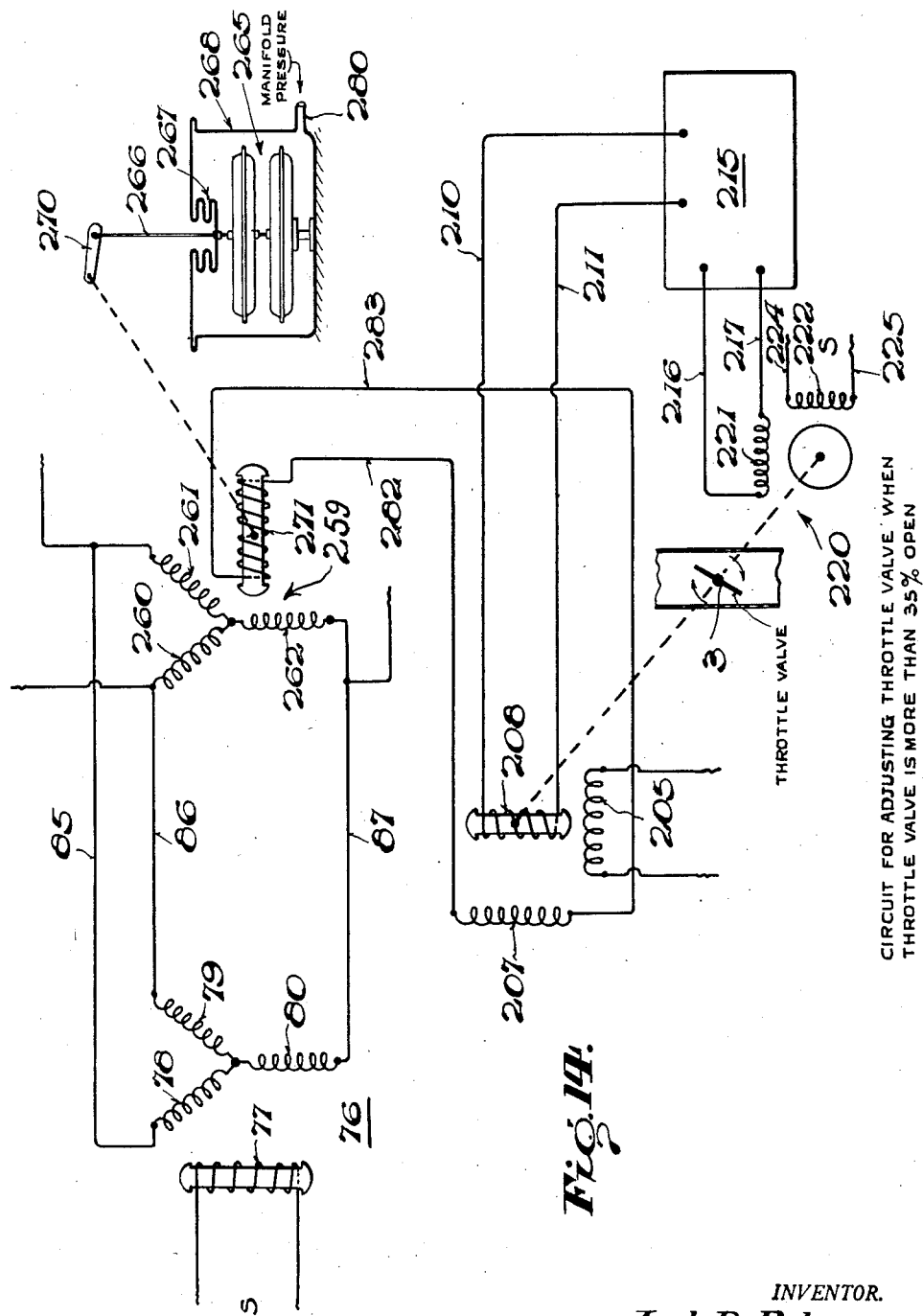
Figure 14 is a diagrammatic view of the portion of the electrical control circuit of Figure 2 for adjusting the induction throttle valve when the valve is more than thirty-five percent open.

The manifold pressure follow-up arrangement for maintaining the engine manifold pressure in accordance with the pilot's selected pressure, as shown in Figures 2 and 14, comprises a two-celled evacuated bellows 265, a take-off rod 266, and a bellows seal 267 for sealing the shaft opening in the casing 268. The rod 266 is connected by arm 270 and shaft 269 to a single phase rotor 271 of the receiver transformer 259. The casing 268 is sealed and connects to the intake manifold of engine 4 by conduit 280, as shown in Figures 2 and 10.

Thus when the evacuated diaphragm 265 collapses, as the pressure at the intake manifold increases a resulting pull is exerted on rod 266, thereby moving rotor winding 271. Now, if the pressure selected by control lever 1 connected to transmitter 76 is different from the then existing engine manifold pressure, there is a voltage induced in the rotor 271 due to its angular relationship to the resultant field produced in the stator windings 260, 261, and 262. Accordingly, if the position of the rotor 271 which is determined by the engine manifold pressure in relation to the stator windings 260, 261 and 262 corresponds to the null position, there will be no voltage induced in the rotor 271. However, if the rotor winding 271 is not at a null position relative to the position of the rotor winding 77 a voltage will be induced in the winding 271, the phase of which is determined by the direction of the difference in the relative positions of the rotor winding 77 and 271. The voltage so induced in the rotor 271 is applied through conductor 282 and 283 to the stator winding 207, this induces a corresponding voltage in the rotor winding 208 of the inductive switch 206 causing a flow of alternating current through conductors 210 and 211 to the input of the amplifier 215.

As previously explained, output conductors 216 and 217 lead from the amplifier 215 to the secondary winding 221 of motor 220. The main winding of the motor 220 is connected to the constant source of alternating current by conductors 224 and 225, the phasing between these voltages is such that the motor angularly positions the throttle 3 in such a direction that the resulting increase or decrease in the manifold pressure turns the rotor winding 271 toward the null position to agree with the pressure change.

Thus it will be seen that the throttle 3 is adjusted by the motor 220 so as to maintain a pressure in the intake manifold as selected through manual operation of the control lever 1. Moreover such selected pressure is increased by movement of the control lever 1 in a clockwise direction and transmitter rotor 77 in a counter-clockwise direction, requiring a corresponding counter-clockwise movement of the rotor 271 to balance the transmitter rotor 77.

After the throttle 3 has been initially opened to a position in excess of a predetermined degree of say eighty percent, then a further call for an increase in the intake manifold pressure through operation of rotor winding 271 will cause operation of motor 220 to in turn vary the speed of a supercharger 300 by adjustment of rotor winding 201 relative to stator windings 202, 203 and 204 controlling supercharger speed control motor 310 as will be explained.

Operation of the supercharger 300 will cause the intake manifold pressure to be increased and as a result the pressure member 265 will again apply voltage to the throttle actuator motor 220 to return the throttle valve 3 to the eighty percent reference position.

Supercharger control

As explained in detail hereinafter and shown schematically at Figures 2 and 15, in the event the throttle valve 3 has been opened to the predetermined degree of eighty percent upon a further call for increase in the intake manifold pressure the further opening of the throttle valve 3 will effect operation of the auxiliary supercharger indicated in Figure 10 by the numeral 300.

The auxiliary supercharger 300 may be driven by suitable driving means shown diagrammatically in Figure 10, such as a turbine indicated by the numeral 301 and driven by the exhaust gas from engine 4 through exhaust conduit 302. The auxiliary supercharger 300 has an air inlet conduit 303 which may be connected to an air scoop in a conventional manner.

There is further provided an air conduit 304 leading from the outlet of the auxiliary supercharger 300 to the inlet of a main supercharger 4A driven by the crank shaft of the engine 4. A carburetor 307 having a throttle 3 is provided in the air conduit 304 in the conventional manner. The speed of rotation of the supercharger 300 and turbine 301 is controlled by a waste gate 305. The control system for the supercharger 300 is shown diagrammatically in Figure 2 and also in Figure 15. In the instant case the waste gate 305 and thereby the speed of the supercharger 300 is controlled through the system of Figures 2 and 15 by a motor 310 which adjustably positions a rod 311. The motor 310 being connected to the rod 311 by a shaft 312, train of gears 314, and shaft 315 connected to an arm 320 to which the rod 311 is operably connected. Motor 310 is of a reversible two-phase type, such as previously described having a secondary winding 321 and a primary winding 322. Operation of the motor 310 is in turn controlled by the transformer 200 having rotor winding 201 and stator windings 202, 203 and 204, as shown schematically by Figures 2 and 15.

A conductor 330 leads from the stator winding 202 through conductor 87A to a stator winding 331 of transformer 335. The transformer 335 has stator windings 331, 337 and 338, the stator winding 331 is connected to the stator winding 337 by a Y connection and through winding 337 and electrical conductor 340 to an acceleration over-speed responsive device 400, as will be explained hereinafter, and through the device 400 to the input of an amplifier 350 of similar type to amplifiers 110 and 215.

Conductor 351 leads from the stator winding 204 of the transformer 200 to the input of the amplifier 350. A rotor winding 336 of the transformer 335 is connected by conductors 360 and 361 to the conductors 63 and 64 leading from the main source of alternating current.

The rotor 201 is so arranged in relation to the stator windings 202 and 204 of the transformer 200 that upon the throttle being positioned by the motor 220 to a position less than a predetermined null position of, for example, eighty percent open, a combined voltage will be induced into the windings 202 and 204 which will be opposed to the combined voltage induced into the windings 331 and 337 by the alternating current in the transformer 335. The difference between such combined voltages will cause a flow of current to the input of the amplifier 350 and through output conductors 362 and 363 to the secondary winding 321. The said current in the winding 321 having such a phase relationship with the alternating current flowing in the main winding 322 as to tend to rotate the motor 310 in a direction opening the waste gate 305.

In the initial adjustment of the valve 3 from a closed position, the waste gate 305 will be held in an open position by this action of the motor 310 until the null point of the throttle valve of said eighty percent open has been passed.

When the throttle 3 has been adjusted to a position in excess of the null point, the combined voltage induced in the windings 331 and 337 and that induced in the windings 202 and 204 by the alternating current in the winding 201 will have an opposite difference. Such predominating voltage will cause a flow of current to the input of the amplifier and to the secondary winding 321 opposite to that previously described and the current flowing in the secondary winding 321 will be of a phase sufficient to initiate operation of the motor 310 in a direction for closing the waste gate 305.

There is also affixed to the shaft 320 a cam 380 on the cam surface of which rides a cam follower arm 381 which adjusts through a shaft 382, the rotor winding 336 of the transformer 335. The cam surface of the cam 380 as shown in Figures 7 and 8, is such that the cam 380 adjusts the rotor winding 336 only within an initial closing range and an extreme closing range of the waste gate 305. The winding 336 thus provides within these limited ranges a follow-up responsive to the position of the throttle 3 whereby there is induced into the stator winding 331 and 337 a voltage which will be equal to the voltage induced in the stator windings 202 and 204 by the rotor winding 201 at corresponding positions of the rotor windings.

Between these two extreme ranges, control of the speed of the supercharger will be controlled by the position of the throttle valve to one side or the other of the null point in response to the operation of the pressure responsive member 265 controlling the transformer 259. Thus between the two extreme ranges there is a range wherein control of the supercharger 300 is effected in response to the intake manifold pressure as indicated in Figure 8.

It will be readily seen that as the waste gate 305 is closed the speed of the turbine 301 will be increased and the supercharger 300 will be driven by the turbine through a driving shaft 306 at an increased speed. An increase in the driving speed of the supercharger 300 will effect an increase in the pressure supplied to the intake manifold which will, through conduit 280, cause the bellows 265 to further contract moving the rotor winding 271 into a position calling for less pressure and effecting through windings 207 and 208 of the induction switch 206, amplifier 215 and motor 220 movement of the throttle in a closing direction which will move the winding 201 toward the null position. When the throttle 3 has reached this null point the combined voltages induced into the windings 331 and 337 will neutralize stopping the further opening of the waste gate 305.

Should the pressure within the intake manifold increase for any reason the bellows 265 will contract moving the rotor winding 271 in a direction calling for less pressure, whereupon the motor 220 will actuate the throttle 3 in a closing direction and causing a difference in the combined voltages induced in the windings 202 and 204 through the winding 201, and the combined voltages induced in the winding 331 and 337 by the alternating current in the rotor winding 336.

This difference in voltage will affect the winding 321 of the motor 310 through the amplifier 350 in such a manner as to cause the motor 310 to rotate in a reverse direction tending to open the waste gas 305 whereupon the turbine 301 will be driven by the exhaust gas from the engine 4 at a slower rate effecting a decrease in the intake manifold pressure to the selected value.

From the foregoing it will be readily seen that there is provided novel means operable through power control lever 1 for first positioning the throttle valve in accordance with a selected intake manifold pressure, and further novel means for increasing this intake manifold pressure upon the throttle being positioned in excess of a null point including novel means whereby the speed of the supercharger may be regulated in accordance with the intake manifold pressure so as to maintain the pressure selected through operation of the power control lever 1. The selection of the intake manifold pressure may be varied as desired within the range of the system.

*Overspeed responsive control circuit*

Stabilization of the waste gate actuator or supercharger speed control means motor 310 is specifically provided by a control system 400 including an alternating current generator 401 driven by a shaft 402 from the supercharger turbine shaft 306, as shown in Figure 10.

The voltage and frequency output of the generator 401 is directly proportional to the speed of the supercharger driving turbine means 301. As shown in Figures 2 and 16 the generator 401 is connected through electrical conductors 410 and 411 into the control system indicated generally by numeral 400. Electrical conductors 415 and 416 lead from the input conductors 410 and 411 into a high pass frequency filter indicated by numeral 419. The high pass filter includes a condenser 420 having one plate connected to conductor 416 and the opposite plate connected by the electrical conductor 425 to one plate of a second condenser 430. An electrical conductor 431 leads from the opposite plate of the condenser 430 to a rectifier circuit indicated generally by the numeral 433.

An inductance 423 is connected between the electrical conductors 415 and 425 to form with the condenser 420 and 430 a T-type high pass filter which is so arranged that low frequency currents from the generator 401 are substantially cut off, while currents having a frequency in excess of a predetermined value resulting from excessive speed of the supercharger driving means will be passed through the filter 419 for performing a control function, as will be explained.

Resistances 440 and 441 are connected by conductor 442 in series between the electrical conductors 415 and 431. A conductor 445 leads from a center tap 443 on conductor 442 between the resistances 440 and 441 so that the resistances 440 and 441 form opposite legs of the rectifier bridge circuit 433. The conductors 415 and 431 lead to plate elements 449 and 450 of rectifier tubes 451 and 452 respectively. Cathode elements 455 and 456 of the respective rectifier tubes are connected by an electrical conductor 460. A conductor 461 leads from a center tap 462 on the conductor 460 between the cathodes 455 and 456. Conductors 445 and 461 form output conductors for the rectifier 433. Through this arrangement, it will be seen that the high frequency current which passes through the high pass filter 419 is converted through rectifier 433 into pulsating direct current having a negative charge at the center tap 443 and a positive charge at the center tap 462. The electronic flow moving in the conductor 445 in a direction from the center tap 443 and in the conductor 461 toward the center tap 462.

The conductors 445 and 461 lead from the center tap 443 and 462 respectively to a low pass filter arrangement indicated generally by the numeral 465 and including an inductance 470 having one end connected to the conductor 461 and the opposite end connected to a conductor 471. Condenser 485 is shunted across the conductors 445 and 461 while condenser 486 is shunted across conductors 445 and 471. A load resistance 475 is connected across the conductors 445 and 471.

The pulsating "rectifier" direct current from the rectifier 433 is passed through the inductance 470 with some opposition which tends to oppose any pulsations in the current. The condenser 485 and 486 in the filter circuit 465 tend to absorb the pulsations in this direct current, so as to leave the output current in the load resistance 475 substantially free of all pulsations.

The conductor 471 is connected at its end to the grid 480 of the electronic valve 481. The conductor 445 is connected to one end of a secondary winding 500A of a transformer 500. The opposite end of the secondary winding 500A is connected by a conductor 487 leading to an end of a resistance 489 connected at its opposite end by a conductor 490 leading to a cathode 491 of the electronic valve 481. A heater for the cathode 491 and its energizing circuit is indicated generally by the numeral 495.

The transformer 500 previously noted has a primary winding 500B which is connected at its opposite ends to conductor 501 and 502, which as shown in Figure 2 lead to the main source of alternating current through conductors 63 and 64 respectively.

A battery or other suitable source of electrical energy 505 provides a source of direct current and has its negative terminal connected through conductor 506 to the conductor 487, while its opposite positive terminal is connected by a conductor 507 to one terminal of a primary winding 510 of a transformer 515. The opposite terminal of the primary winding 510 is connected by a conductor 520 to a plate 525 of the electronic valve 481.

The transformer 515 has a secondary winding 535 which is connected in the conductor 340. The conductor 340, as shown in Figure 2, leads from the stator winding 337 of the transformer 335 to the input of the amplifier 350 which controls operation of the two-phase motor 310 for regulating the speed of the supercharger 300.

A resistor 530 is connected between the conductor 507 and the conductor 490 leading to the cathode 491 of the electronic valve 481. The resistances 489 and 530 serve as voltage dividing means and are connected in series across the negative and positive terminals of the source of electrical energy 505. Since there is a flow of electrical energy through the resistances 489 and 530 connected in circuit with the source of electrical energy 505, there is a fall of potential or a voltage drop through the resistor 530 and through the resistor 489. Thus the cathode 491 connected intermediate the resistances 489 and 530 by the conductor 490 will be at a lower potential than the plate connected to the positive end of the resistor 530. Thus the cathode 491 will be negative with the relation to the plate 525 due to the voltage drop through the resistor 530.

The cathode 491 however will be at a higher potential than the grid 480 connected to the negative end of the resistor 489 through conductors 487, 500A, 475, and 471. Thus the grid 480 will be negative with relation to the cathode 491 and the plate 525 due to the voltage drop or fall of potential through the resistors 489 and 530.

The negative bias thus applied to the grid 480 will tend to normally hold the valve 481 from becoming conductive between the cathode 491 and the plate 525.

However, upon an electronic flow from the rectifier 433 through conductor 445, resistor 475 and returning to the rectifier 433 through the conductor 471, inductance 470 and conductor 461, electron flow through resistor 475 causes a fall of potential through the resistor 475 and a signal voltage to be applied so as to cause the grid 480 to have a higher potential than the cathode 491. Thus the grid 480 will become positive with relation to the cathode 491 permitting the electronic valve 481 to become conductive between the cathode 491 and plate 525. Alternating current flowing in the primary winding 500 of the transformer 500 will induce an alternating current in the secondary winding 500A. The secondary winding 500A is connected at one end to the cathode 491 through conductor 487, resistor 489 and conductor 490, and through resistor 530, and winding 510 to the plate 525. The opposite end of the winding 500A is connected through resistor 475 to the grid 480, so as to vary the electronic flow from the cathode 491 to the plate 525 in response to the alternating current induced into the secondary winding 500A.

Thus upon an electronic flow of a sufficient value from the rectifier 433 resulting from the generator 401 operating at a speed in excess of a predetermined maximum speed, the grid 480 is biased by a signal voltage to a sufficient positive value relative to the cathode 491 to permit electronic flow from the cathode 491 to the plate 525.

The resulting electron flow through the electronic valve 481 controlled by the alternating current induced in winding 500A will effect a corresponding pulsating current flow through primary winding 510 in the plate circuit inducing a current into the secondary winding 535, which will be conducted to the amplifier 350. Such current will then be amplified and carried by conductors 362 and 363 to the secondary winding 321, where the same will under operation of the amplifier 350 bear an out of phase relationship of 90 degrees from the current in main winding 322 so as to cause rotation of the motor 310 in a direction for decreasing the speed of the supercharger 300.

Such speed decreasing operation will cease, when the frequency of the current produced by the generator 401 has been decreased to a value corresponding to that produced when the speed of the supercharger is within the predetermined desired range.

Thus there is provided novel electronic means for maintaining the speed of the supercharger 300 within a predetermined range and thereby preventing overspeeding of the supercharger.

*Acceleration responsive control circuit*

There is further provided novel electronic means for maintaining the rate of change in the speed of rotation of the supercharger within a predetermined value.

This latter acceleration responsive means includes the input conductors 550 and 551 which lead from the conductors 410 and 411 into a rectifier bridge circuit indicated generally by the numeral 555.

The latter rectifier bridge circuit, includes the resistances 560 and 561 connected by conductor 562 in series across the conductor 550 and 551.

A conductor 570 leads from a center tap 571 on conductor 562 between the resistances 560 and 561 so that the resistances 560 and 561 form opposite legs of the rectifier bridge circuit 555.

The conductors 550 and 551 lead to plate elements 575 and 576 of rectifier tubes 580 and 581 respectively. Cathode elements 585 and 586 of the respective rectifier tubes are connected by electrical conductor 587. A conductor 590 leads from a center tap 591 on the conductor 587 between the cathodes 585 and 586. Conductors 570 and 590 form output conductors from the rectifier 555.

Through this arrangement, it will be readily seen that the alternating current carried to the rectifier 555 through conductors 550 and 551 is converted into pulsating direct current having a negative charge at the center tap 571 and a positive charge at the center tap 591. The electronic flow moving in the conductor 570 in a direction from the center tap 571 and in the conductor 590 in the direction toward the center tap 591.

The conductors 570 and 590 lead from the center taps 571 and 591 respectively to a low-pass filter arrangement indicated generally by the numeral 595.

This low-pass filter is similar in operation to the filter 465 previously described, and includes an inductance 596 connected at one end to the conductor 590 and a second conductor 597 connected at the opposite end. There is further provided, a condenser 598 shunted across the conductors 570 and 590 a second condenser 599 shunted across the conductors 570 and 597. There is further connected across the conductors 570 and 597 a load resistance 600.

The low-pass filter 595 is so arranged that the pulsating direct current from the rectifier 555 is opposed and the pulsations absorbed so that the output current to the load resistance 600 is substantially free of all pulsations. The conductors 570 and 597 lead into a circuit indicated generally by numeral 601 and responsive to the rate of change in the current produced by the generator 401, due to changes in the driven speed thereof, as will be explained.

A condenser having plates 611 and 612 has the plate 611 connected to the conductor 597, while the opposite plate 612 is connected by conductor 613 to a grid 614 of an electronic valve 615.

A second condenser having plates 621 and 622 has the plate 621 connected to the conductor 570 while the opposite plate 622 is connected by conductor 623 to a grid 624 of an electronic valve 625.

Resistors 630 and 631 are connected by conductor 632 in series across the conductors 613 and 623. A conductor 640 leads from a center tap 633 in the conductor 632 between resistors 630 and 631.

The conductor 640 is connected to one end of a secondary winding 641 of a transformer 642. The transformer 642 has a primary winding 643 connected through conductors 501 and 502 to the conductors 63 and 64 leading to the main source of alternating current.

The other end of the secondary winding 641 is connected by a conductor 645 to a center tap 646 on a conductor 648 which connects cathodes 650 and 651 of the electronic valve 615 and 625 respectively. Heaters 655 and 656 are provided for the respective cathodes 650 and 651 and the energizing circuit is indicated generally by the numeral 660.

The electronic valves 615 and 625 have plate elements 661 and 662. A conductor 663 leads from the plate 661 to one end of a winding 664A of a primary winding 664 of transformer 665. The opposite end of winding 664B of the primary winding 664 is connected by conductor 670 to the plate 662.

The primary winding 664 has a center tap 671 which divides the primary winding 664 into equal portions 664A and 664B. A conductor 675 leads from the center tap 671 to the positive terminal of a battery or other suitable source of electrical energy indicated generally by numeral 680.

The negative terminal of the source of electrical energy 680 is connected to the conductor 645 leading to the center tap 646.

The transformer 665 has a secondary winding 690 connected in series with the winding 535 in the conductor 340. The conductor 340, as previously explained, is connected from the stator winding 337 of the transformer 335 to the input of the amplifier 350 so that current induced into the winding 690 from the winding 664A or the winding 664B may be induced to the amplifier and through conductors 362 and 363 so as to effect the operation of the motor 310 in one direction or the other depending upon whether or not the current is induced into the secondary winding 690 from the primary winding 664A or 664B.

As shown in Figure 16 electronic flow in the winding 664A is from the plate 661 downward toward the center tap 671, while the electronic flow in the winding 664B is from the plate 662 upward toward the center tap 671.

Normally upon the generator 401 being operated at a constant speed the plate 611 of the condenser 610 will bear a higher potential than the plate 621 of the condenser 620 due to the voltage drop or fall of potential through the resistor 600. Thus plate 611 will bear a positive charge, while the plate 621 will bear a negative charge.

Since the plates 612 and 622 are connected through resistors 630 and 631 any charge induced into one of said plates will be electrically opposite to that in the other and will neutralize through the resistors 630 and 631. Thus during such times as there is no change in the charges on plates 611 and 621 there will be no difference in the potential of condenser plates 612 and 622. The potential applied to the grids 614 and 624 will therefore be equal and the flow from the cathode 650 to the plate 661 and from the cathode 651 to the plate 662 will be substantially equal, whereupon the electronic flow through the primary windings 664A and 664B will be equal and in opposite direction so as to neutralize.

However, upon an increase in the speed of the supercharger 300, the voltage produced by the generator 401 through the rectifier 555 will be increased and the positive potential on plate 611 and the negative potential upon the plate 621 will likewise be increased, due to the resulting increase in the voltage drop or fall of potential through the resistance 600.

Such increase in the negative potential on condenser plate 621 will effect an increase in the repulsive effect on the electrons in the dielectric material and in the electrostatic forces acting between the plates 621 and 622, so as to cause a flow of electrons from the condenser plate 622 through resistances 630 and 631 to the condenser plate 612 to equalize the effect of the increased electromotive forces acting on the condenser plates 611 and 621. The condenser plate 612 during such discharge period or period of increase in the speed of the supercharger 300 acquires a higher potential than the plate 622 due to the voltage drop incident to the electronic flow through the resistances 630 and 631 from the condenser plate 622 to the condenser plate 612.

The grid 624 connected to the condenser plate 622, thereby acquires a negative potential, while the grid 614 connected to the condenser plate 612 acquires a positive potential.

Moreover due to the voltage drop through the resistances 630, the cathode 651 will have a positive potential relative to grid 624. Conversely, due to the voltage drop through resistor 631, the cathode 650 will acquire a negative potential relative to the grid 614. Under these conditions, it will be readily seen that the electronic flow from the cathode 651 to the plate 662 will decrease, while the electronic flow from the cathode 650 to the plate 661 will increase.

The secondary winding 641 is connected through conductor 640 to the respective grids 614 and 624 through center tap 633 and through conductor 645 to the respective cathodes 650 and 651 through center tap 646. The electromotive force induced into the secondary winding 641 from the primary winding 643 will further control the flow of electronic energy from the cathode to the plate of the respective electronic valves 615 and 625. Thus upon the grid 614 having a positive potential relative to the cathode 650, as previously explained, electrons will flow from the cathode 650 to the plate 661 through conductor 663 winding 664A and returning to the positive terminal of the source of electrical energy 680. The resulting current flow will be a pulsating direct current of a frequency corresponding to that of the main alternating current supply. The electromotive force acting in the winding 664A will over-balance that in the winding 664B since the grid 624 controlling the latter flow bears a negative potential relative to the cathode 651 during that period in which the speed of generator 401 is increasing so as to thereby decrease the electromotive force acting in the winding 664B.

The predominating pulsating direct current flow in the winding 664A will induce an electromotive force in the secondary winding 690 which through the conductor 340 will tend to effect through the motor 310 a decrease in the speed of rotation of the supercharger 300 and thereby lower the rate of increasing the speed (acceleration) of rotation of the supercharger 300 and accordingly the rate of change in the speed of rotation of the generator 401.

The rate circuit 601 is thus so arranged as to substantially prevent the speed of the supercharger 300 from being increased at a rate greater than a value determined by the difference of the throttle from its null position.

The rate circuit 601 is also arranged to substantially prevent the speed of the supercharger from being decreased at a rate greater than a value determined in a like manner.

Thus upon the speed of the supercharger 300 being decreased, causing a corresponding decrease in the speed of the rotation of the generator 401, the positive potential applied to the condenser plate 611 and the negative potential applied to the condenser plate 621 will likewise be decreased due to a decrease in the voltage drop through the resistance 600.

A decrease in the negative potential applied to the condenser plate 611 will effect a decrease in the repulsive effect on the electrons in the dielectric material and the electrostatic forces acting in the dielectric material between the plates 621 and 622 so as to cause a flow of electrons from the condenser plate 612 through resistance 630 and 631 to the condenser plate 622 to equalize the effect of the decrease in electromotive force acting on the condenser plates 611 and 621. The condenser plate 622 during such electronic discharger period, or the speed decreasing period of the supercharger 300, acquires a higher potential than the condenser plate 612 due to the voltage drop or fall of potential incident to the electronic flow through resistances 630 and 631 from the condenser plate 612 and 622.

The grid 624 connected to the condenser plate 622 thereupon acquires a positive potential relative to the cathode 651, while the grid 614 acquires a negative potential relative to the cathode 650.

Thus the electronic valve 625 becomes more conductive than the electronic valve 615, whereupon the pulsating electromotive force in winding 664B will predominate over that in winding 664A causing an electromotive force to be induced in winding 690 which will have the opposite effect to such a force induced through winding 664A. Thus the electromotive force induced by winding 664B will, through conductor 340 tend to effect through the motor 310, a relative increase in the speed of rotation of the supercharger 300 and thereby lower the rate of decreasing the speed of rotation of the supercharger 300 and accordingly the rate of change in the speed of rotation of the generator 401.

The rate circuit 601 is thus so arranged as to substantially prevent the speed of the supercharger 300 from being decreased at a rate greater than a value determined by the difference of the throttle from its null position.

Through the novel rate circuit 601 greater stability is added to the system so as to prevent hunting and the acceleration and deceleration of the speed of rotation of the supercharger 300 is maintained within a controlled range.

*Operation*

In operation, when the pilot through lever 1 moves rotor 77 according to a selected position, there is induced a certain combination of voltages in the stator windings 78, 79 and 80. These voltages are applied to the measuring follow-up transformers, for example, the follow-up transformer 259 in the manifold pressure control to thereby cause currents which produce a resultant field in its stator windings 260, 261 and 262.

If the position of rotor 271 of this follow-up transformer, determined by the manifold pressure acting on diaphragm 265, is such that the voltage induced in the follow-up rotor 271 is zero no control operation will be effected. If the rotor 271 is not in this position, as when the measured manifold pressure differs from the pilot's selection, there will be induced a voltage in the follow-up rotor winding 271 the phase of which is determined by the direction of coupling.

The voltage from single phase rotor 271 is then applied through conductors 282 and 283 to stator winding 207 of switch 206. This induces a corresponding voltage in rotor 208, which is carried by conductors 210 and 211 to the amplifier 215, the output of which amplifier feeds the secondary phase winding 221 of the two-phase throttle actuator 220. The other phase winding 222 of this motor 220 is connected to the main source of alternating current.

The phasing between these voltages in the motor windings is such that the motor 220 actuates the throttle 3 through gear trains 241 and 244, and in such a direction that the resulting change in pressure causes the diaphragm 265 to actuate transformer 271 toward the null position.

The same principle of operation applies to the governor actuator, which includes a follow-up transformer 93 positioned by a two-phase motor connected to the output of amplifier 110 which operates as a direct follow-up from the pilot's control lever 1 and the transmitter 77.

This transformer 93 is electrically connected to the pilot's transmitter 77 in a parallel with the manifold pressure transmitter 259, and if the position it measures differs from that selected, it feeds a signal to the input of amplifier 110 by conductors 100 and 101 from its single phase rotor 94. The output of amplifier 110 leads to the secondary winding 113 of the two-phase governor actuator motor 114 to adjust the pitch of the propeller 146, the pitch of the propeller 146 being decreased as the selected manifold pressure is increased by movement of the control lever 1 in a clockwise direction.

In addition to the two-phase throttle actuator motor 220 there is provided the transformer 200 with rotor 201 and stator windings 202, 203 and 204. When the transformer 200 is used as a follow-up at small throttle openings, the voltage induced across the stator windings 202 and 203 thereof is compared with that induced across the stator windings 79 and 80 of the transmitter 76. The difference between these voltages is fed to stator winding 205 of induction switch 206, which through induction to rotor 208 is fed through conductors 211 and 210 to amplifier 215, and its output is fed by conductors 216 and 217 to the secondary winding 221 of the two-phase motor 220 to cause actuation thereof in the proper direction to position the throttle.

Whether the throttle actuator 220 is actuated as a direct follow-up from its connection with transmitter 76, or is actuated from connection with the pressure follow-up transformer 259 is determined automatically by cam 250 driven by the throttle actuator motor 220 through shaft 242, so as to control the position of the rotor 208 of inductance switch 206. The cam 250 is so shaped and so proportioned as to transfer from the direct follow-up connection with the transmitter 76 to a follow-up connection with the engine manifold pressure control follow-up transformer 259 at approximately 35 percent open throttle position.

The transmitter 76 causes a direct follow-up adjustment of the throttle 3 from zero to approximately thirty percent open position and provides manually operable means for overcoming the effects which would otherwise be produced by controlling the throttle valve 3 through the intake manifold pressure in view of the characteristic inversion of pressure at the intake manifold of an engine which occurs upon adjustment of the throttle valve 3 to somewhat less than thirty percent open. Moreover the latter manually operable means facilitates the starting of the engine.

Thus when moving the pilot's control lever 1 in the range corresponding to the zero to thirty percent throttle valve open position, proportional opening of the throttle valve 3 is accomplished and the throttle valve 3 follows the position of the control lever 1.

When the throttle valve 3 is in a position above 35 percent open, the throttle valve 3 is in pressure follow-up, that is, the same is positioned in accordance with the intake manifold pressure selected by the pilot's control lever 1.

When the throttle is between thirty percent and thirty-five percent open the signal to the amplifier 215 is a combination of position follow-up and pressure follow-up. The reason for the latter arrangement is to provide a smooth transition from the position follow-up to the pressure follow-up.

With reference to the throttle actuator motor 220 the rotor winding 201 of the rotary transformer 200 is arranged to induce a voltage in the stator windings 202 and 204 which are in turn connected to the stator windings 331 and 337 of the transformer 335. The rotor winding 336 of the transformer 335 is arranged to induce an opposing voltage in the latter stator windings 331 and 337. The difference between the said opposing voltages determines the direction of rotation of the motor 310. The said rotor windings 201 and 336 being so arranged that when the throttle valve 3 is positioned below a predetermined null point of say about eighty percent open the motor 310 will be actuated in a direction for opening the waste gate 305 so as to decrease the speed of the supercharger 300. Conversely, when the throttle valve 3 is in a position more than the said null position of about eighty percent open the motor 310 will be driven in a direction for closing the waste gate 305 so as to increase the driving speed of the auxiliary supercharger 300 and thereby the pressure within the intake manifold. Such operation thus regulates the boost pressure from the supercharger so that selected pressure can be maintained. However, upon the rotor winding 201 being returned to the null position due to the operation of the manifold pressure responsive means 265 and 259, operation of the motor 310 will cease.

During operation it being remembered that the pressure follow-up transformer 259 is in control if the pressure selected by the pilot through movement of the transmitter 76 is such that the throttle 3 moves to more than the null position or about eighty percent of the wide open position, the throttle transformer 200 causes a signal voltage to be transmitted to the amplifier 350, which in turn operates the two-phase waste-gate motor 310, to close the gate 305 and increase the turbine speed. This will cause an increase in supercharger output, and therefore an increase in manifold pressure. This pressure operates through a manifold pressure responsive element 265 and it is connected to follow-up transformer 259 so as to cause the throttle 3 to close slightly, until about eighty percent open throttle position or the null position is reached. At this position, the transformer 200 in the throttle actuator and the transformer 335 induce neutralized signals to the follow-up motor 310 in the wastegate 305 in the adjusted position.

Should the pilot now select a different pressure by moving the transmitter rotor 76, the measured manifold pressure and selected pressure will differ, and the throttle 3 will then be moved to produce the desired value. Since the throttle actuator transformer 200 has moved from the null position, or from about eighty percent open throttle position, it causes a signal to be transmitted to the wastegate actuator follow-up motor 310 to change its setting. Again the resulting change in manifold pressure will reset the throttle 3 to its null or about eighty percent open reference position.

If the selected pressure is such that the throttle 3 is held in a position less than the null position, the system will hold the waste gate 305 wide open. On the other hand, if a high pressure is selected, so that the turbine 301 is operating at top speed as limited by the overspeed control network 400, the throttle 3 will be opened more than the null position to produce the selected pressure, or as near this pressure as can be produced with top speed of the turbine 301 and wide open throttle 3.

If the conditions are such that the turbine 301 is operating at any speed between its minimum (as determined with the waste gate 305 wide open), and its maximum (as limited by the overspeed control of the circuit 400), the throttle 3 will always be at the null position or about eighty percent open, except during transients. The purpose of using this reference position, instead of waiting until the throttle 3 is wide open before increasing the speed of the turbine 301 is to have a means of immediately providing any required change in pressure without waiting for the turbine 301 to accelerate and also to allow for the time delay required for the air to flow to the engine. Without this feature, a selection of higher pressure for more power without moving the throttle 3 would require closing of the waste gate 305 and momentary loss of engine power due to higher exhaust pressure.

The novel method of regulating the air intake manifold pressure of an aircraft engine, as herein disclosed, is claimed in a divisional U. S. application Serial No. 350,724, filed April 23, 1953 by Joel D. Peterson, now U. S. Patent No. 2,713,335, granted July 19, 1955 and assigned to Bendix Aviation Corporation.

Further in order to add stability to the system a novel rate circuit 601 is provided in the circuit 400 for preventing acceleration or deceleration of the supercharger 300 in excess of a controlled limit.

In case of failure of the system or the main alternating current supply, a combined electromagnetic and mechanical clutch is provided between the automatic throttle actuator means and the throttle valve 3, so that when power is on, the electromagnetic clutch is connected to the automatic throttle actuator means. If the power is turned off, the clutch 2 shifts the connection of the throttle from the automatic throttle actuator means to a mechanical connection for manual operation by lever 1 through clutch 2. When the power is turned off, a suitable spring, not shown, may be provided which will open the waste gate 305, and the propeller pitch governor will remain at the setting in which it happened to be at the time that the power was turned off.

There is thus provided a novel electrical engine control system which does not require the usual long connections between the pilot's cockpit and the engine nacelle. Also there is thus provided a plurality of inductively coupled controls, so arranged as to automatically adjust the various functions of the engine to values consistent with efficient and safe operation of the engine. Further there is provided compensation for external factors such as changes in atmospheric pressure for the power selected by the pilot whereby the several electrical actuators are energized to perform their functions within the range of engine performance.

The inductively coupled controls include a master transmitter controlled by a single lever in which the angular position thereof is proportional to predetermined engine speed and manifold pressure values sensed by other inductively coupled controls, whereby the manifold pressure values selected by the pilot by the positioning of the transmitter will automatically be maintained within the performance range of the engine and each adjusted position of the lever will effect a corresponding definite adjustment of a propeller pitch governor so that each adjusted angular position of the pilot's control lever will effect a definite power output from the engine by selection of the manifold pressure and adjustment of the propeller pitch engine speed governor. The feature of the variable inductive coupling controls to effect the foregoing is claimed in a copending divisional U. S. application Serial No. 350,723 filed April 23, 1953, by Joel D. Peterson and assigned to Bendix Aviation Corporation.

Further there is embodied in the system, a novel electrical supercharger acceleration and deceleration rate regulating system to provide greater stability to the system together with a novel electrical supercharger overspeed regulating system.

Modified form

A modified form of the invention is shown in Figure 17 wherein the like numerals indicate like parts to those previously described.

In the form of the invention previously described the amount of rate (turbo acceleration) signal used to stabilize the control system for the supercharger 300 is of necessity a compromise between a higher value stabilizing signal for better stability and a lower value stabilizing signal to allow a more rapid change to a desired setting. This latter characteristic is particularly desirable under take-off conditions.

Since the signal to the waste-gate amplifier 350 represents the difference between the position of the throttle 3 and the null position or approximately eighty percent open position of the throttle 3, it will be seen that in the increase pressure direction this difference can not exceed the value for wide open or 100% throttle open position, regardless of the amount of turbo boost increase required. Also in the form of the invention previously described the turbo boost is not called for until the throttle has exceeded its null position or approximately eighty percent open position.

To overcome these and other difficulties there is provided in the modified form of the invention shown in Figure 17 novel means whereby along with the signal applied to the waste-gate amplifier 350 of Figures 2 through 16, there will be added the signal to the throttle actuator amplifier 215. Then, when the actual manifold pressure differs from the selective pressure, the signal produced by this difference (throttle amplifier signal) will be applied to the waste-gate amplifier 350 to cause operation of the turbine 301, which will aid the throttle position signal in overcoming the rate signal and allow more pressure build-up.

In order to accomplish the foregoing the conductor 340 leads directly from the stator winding 337 of the transformer 335 to the input of the waste-gate amplifier 350. The conductor 351 leads from the opposite input connection of the amplifier 350 to the secondary winding 535 and 690 of the acceleration and overspeed responsive control circuit indicated by numeral 400; the conductor 351 leads from the control circuit 400 to the secondary winding 700 of a transformer 701, connected in series in the conductor 351. From the transformer secondary winding 700 the conductor 351 leads to the stator winding 204 of the throttle transformers 200. There is further provided the conductor 283 which leads from the rotor winding 271 of the pressure responsive transformer 259 to a primary winding 702, connected in a series with the conductor 283. The conductor 283 leads from the primary winding 702 to the stator winding 207 of the induction switch 206.

As shown in Figure 17 the primary winding 702 is positioned in inductive relation with the secondary winding 700. Thus upon a signal being impressed upon the rotor 271 adjustably positioned in relation to the stator windings 260, 261, 262 in response to change in the manifold pressure upon the bellows 265, it will be seen that a corresponding signal will also be impressed upon the primary winding 702 which signal in turn will be induced into the secondary winding 700. Thus upon the pressure responsive means 265 calling for more pressure there will be induced to the winding 700 a corresponding signal which through the waste-gate amplifier will cause adjustment of the waste-gate in a direction for increasing the speed of the supercharger 300 as well as impressing a signal upon the winding 205 which through the throttle amplifier 215 will cause actuation of the throttle 3 in a further open position.

Simultaneous adjustment of the throttle and wastegate actuators will cause the intake manifold pressure to more rapidly approach the selected value. It will be seen further that the value of the signal impressed through the primary winding 702 upon the secondary winding 700 will vary with the amount of change in pressure required to meet the selected value.

Thus for example if the intake manifold pressure is greatly below the selected value the voltage induced in the winding 700 would be much greater than that induced in the winding 700 if the actual pressure were nearer the selected value. Thus such a greater voltage value will permit greater rate of change in the speed of the supercharger in view of the greater total combined voltage induced through the action of the transformers 200 and 335 and the winding 700 over that of the rate signal induced in the winding 690. Thus, a more rapid pressure change is permitted under conditions of relatively extreme pressure differences between the actual and selected intake manifold pressure.

As will be readily seen this rate of pressure build-up will decrease upon the actual pressure more nearly approaching the selected value. A higher rate sensitivity is then allowable for this system for better stability, since in effect in the modified form of invention shown in Figure 17 the rate sensitivity is decreased at larger pressure differences.

Although the present invention is described and illustrated in detail for several embodiments thereof, it is to be expressly understood that the same is not limited thereto. Various changes may be made in design and arrangement of the parts illustrated, as will now be apparent to those skilled in the art. For a definition of the limits of the invention, reference should be had to the appended claims.

What is claimed is:

1. An engine control system for controlling the functions of the engine, comprising pilot control means for selecting a desired manifold pressure, an engine throttle, manifold pressure responsive means for controlling the throttle, a variable speed supercharger for maintaining the manifold pressure in agreement with the selected pressure, and supercharger speed control means operatively connected to said throttle and including means responsive to the position of said throttle for affecting the speed of said supercharger, said last mentioned means continuously increasing the speed of the supercharger within its operating limits so long as the throttle remains in a position to one side of a predetermined partially open position, and said last mentioned means continuously decreasing the speed of the supercharger within its operating limits so long as the throttle remains in a position to the other side of the predetermined partially open position, so as to thereby automatically maintain the actual manifold pressure equal to the pilot selected manifold pressures within a correlated performance range of the engine.

2. A control for an internal combustion engine comprising a throttle, a throttle lever, a first electrical means for actuating said throttle and connected to said throttle lever in such a manner that within a predetermined range said throttle lever may set said throttle to selected throttle positions, a second electrical means electrically connected to said first electrical throttle actuator, and means responsive to engine manifold pressures connected to said second electrical means and so arranged that within a second predetermined range said second electrical means operates said first electrical throttle actuator independently of the set position of said throttle lever, until the throttle is positioned by said first electrical throttle actuator to a position within the first predetermined 3. A control for a throttle of an internal combustion engine comprising an electrically operated actuator for said throttle, a master electrical control, an auxiliary pressure responsive electrical control connected to said throttle actuator and to said master control, including inductive coupling means to operate said throttle actuator from said auxiliary pressure responsive control to effect pressures corresponding to settings of the master control.

4. A control for a supercharged internal combustion engine having an electrically operated throttle, comprising an electrical throttle actuator, an electrical throttle position measuring device adapted to be controlled by said throttle actuator, a master electrical control connected to said throttle actuator, a pressure responsive electrical control connected to said throttle actuator and said master control, means adapted to operate said throttle from said pressure responsive control for effecting a pressure corresponding to that selected by said master control, and auxiliary means for regulating the supercharge pressure supplied to the engine and connected to said position measuring device so as to thereby maintain said selected pressure.

5. For use with an aircraft engine having an induction throttle valve, a supercharger, and a control valve for said supercharger; the combination comprising, a first system including a pilot's control lever arranged to select desired manifold pressures, a constant source of power, a variable transmitter connected to said control lever and said source of power having each of its respective positions representative of a manifold pressure measurement, a two phase actuator motor for positioning the induction throttle valve, said motor having one phase thereof connected to said constant source of power and the second phase thereof connected to said variable transmitter, whereby the output of said transmitter provides energy to drive said motor as a function of said transmitter's position at predetermined throttle openings, an electrical means adapted to be energized at predetermined throttle openings, and a second system adapted to operate independently of the first system when a difference exists between the pilot's selected manifold pressure and the engine's manifold pressure, including means automatically responsive to the throttle valve's position to connect said second system with the second phase of said throttle actuator motor at above said first mentioned predetermined throttle openings, a variable electrical follow-up means adapted to measure the conditions of the engine's manifold pressure connected to the second phase of said throttle actuator motor, a two-phase motor adapted to position said supercharger control valve having one phase thereof connected to said constant source of power and the second phase thereof connected to said electrical means energizable at predetermined throttle openings, whereby the voltage output of said electrical means is applied to the said second phase winding of said supercharger control valve motor to provide energy to drive said motor, and an electrical means driven by said last mentioned motor adapted to correlate the supercharger control valve with the position of the throttle valve to provide equalization of pilot selected manifold pressures and engine manifold pressures.

6. For use with an aircraft engine having an induction throttle valve, an engine speed governor, a turbo-supercharger driven by the exhaust gas from the engine, and a waste gate for controlling the speed of the turbo-supercharger; the combination comprising a plurality of amplifier circuits, a master transmitter, a pilot's control lever for controlling said master transmitter, each position of said lever being representative of a desired manifold pressure and a corresponding engine speed, a transformer for said engine speed governor, said governor transformer adapted to measure the position of the lever as a function of the master transmitter and apply voltage through one of said first mentioned amplifier circuits, an actuator motor for controlling said governor and connected to the output of said one amplifier circuit, a governor cam adapted to correlate the governor's position with respect to the position of the master transmitter, manifold pressure responsive means, an engine manifold pressure follow-up transformer operably connected to said pressure responsive means so as to measure the manifold pressure conditions, inductive coupling means to shift control of said throttle valve from said master transmitter to said pressure follow-up transformer, a polyphase actuator motor for controlling said throttle valve and connected in circuit with said inductive coupling means and adapted to operate from said master transmitter when said inductive coupling means is in one position and from said pressure transformer when said inductive coupling means is in another position, said pressure actuated transformer connected to said master transmitter and being adapted to measure engine manifold pressures and to actuate the polyphase throttle valve actuator motor by applying its voltage output to the variable phase thereof through a second of said amplifier circuits to thereby open said throttle valve to a position for maintaining engine pressure equal to the pilot selected manifold pressure, a throttle valve transformer arranged to be energized and de-energized at predetermined throttle openings, a polyphase actuator motor for controlling said waste-gate and connected to the output of a third one of said amplifier circuits and adapted to function from the throttle valve measuring transformer for rotation in one direction, a transformer adapted to be positioned by said waste-gate actuator motor, until said transformer connected to said waste-gate actuator motor measures a predetermined correlated position of the waste-gate with respect to the position of the throttle valve transformer, said waste-gate transformer being adapted to feed back voltage into said last mentioned third amplifier circuit in opposition to a signal tending to run said waste-gate actuator in said one direction and said waste-gate actuator motor adapted to function from the waste-gate transformer for rotation in another direction when said feed back voltage predominates, and means adapted to control the motion of said waste gate valve with respect to an increase or decrease in the driven speed of said supercharger as a function of the acceleration of said turbo-supercharger and thereby operate the same at stabilized rates, and means for varying the permissible acceleration rates as a function of said manifold pressure follow-up transformer.

7. In an electrical engine control system for aircraft engines, in combination, a pilot's power lever, an electrical master transmitter device connected to said power lever having each position thereof representative of a selected power to be maintained, a throttle valve for the engine, electrical means for effecting operation of said throttle valve, pressure responsive means for effecting operation of said throttle valve through said electrical means after a predetermined throttle opening has been reached, electrical induction coupling means adapted to effect said throttle operation from said pressure responsive means, whereby the actual engine power equals the engine power selected by the pilot's power lever, and means for effecting control of said throttle valve directly from said pilot's power lever until said predetermined throttle opening has been reached.

8. For use with an aircraft engine having an induction throttle valve; the combination comprising, a pilot's power lever, an electrical master transmitter device connected to said power lever having each position thereof representative of a selected power to be maintained, electrical means for effecting operation of said throttle valve, pressure responsive means for effecting operation of said throttle valve through said electrical means after a predetermined throttle opening has been reached, and electrical induction coupling means adapted to effect said throttle operation from said pressure responsive means or from said master transmitter dependent upon the position of said throttle valve.

9. For use with an aircraft engine having an induction throttle valve and a variable speed supercharger; the combination comprising, a pilot's power lever, an electrical master transmitter device connected to said power lever having each position thereof representative of a desired power to be maintained, first electrical means for effecting operation of said throttle valve, pressure responsive means for also effecting operation of said throttle valve through said first electrical means after a predetermined throttle opening has been reached, second electrical means adapted to effect said throttle operation from said pressure responsive means, whereby the actual engine power equals the engine power selected by the pilot's power lever, first electrical throttle measuring means connected to said second electrical means and adapted to be energized and de-energized at predetermined throttle openings, a speed control for said supercharger, third electrical means for effecting operation of said speed control means connected to said throttle measuring means, and a second electrical measuring means connected to said third electrical means and adapted to control said supercharger speed-control in co-action with said first electrical throttle measuring means so as to thereby control the output of said supercharger and maintain engine power equal to pilot selected power.

10. For use with an aircraft engine having a supercharger, a throttle valve for the engine, and a control valve for the supercharger; the combination comprising, a first electrical actuator for the throttle valve, a first electrical transformer for energizing said first actuator, and means responsive to manifold pressures for controlling said first transformer; a second and a third electrical transformer for providing opposing voltages, a second electrical actuator for said control valve connected to the output of said second and third electrical transformers, and said second transformer controlled by said first electrical actuator so that the difference between said opposing voltages may be applied to said second electrical actuator to position said control valve in accordance with predetermined throttle valve openings.

11. In an electrical engine control for supercharged aircraft engines comprising a manually operable pilot control master transmitter, an engine manifold pressure responsive control device and a throttle; the combination of an induction coupling means, means for electrically connecting said coupling means to said above named elements, said coupling means including a single phase rotor winding and two-phase stator windings, one of said stator windings being energized by said master transmitter to effect manual operation of the throtttle and the other stator winding being energized by its connection with said engine manifold pressure responsive control device to effect operation of the throttle in response to engine manifold pressures.

12. For use with a variable speed supercharger; the combination comprising means to control the speed of the supercharger, a two phase actuator motor to operate said control means, a generator, means drivingly connecting the generator and the supercharger, whereby the voltage and frequency output thereof is directly proportional to the speed of said supercharger, an electrical network connected to the output of said generator and to the second phase of said actuator motor including a rectifier, a resistance through which said generator output current passes in proportion to acceleration and deceleration of the supercharger, electronic means responsive to a change in rate of fall of potential through said resistance for operating said actuator motor in such a manner as to maintain the rate of acceleration and deceleration of said supercharger within a predetermined range.

13. For use with a variable speed turbo-supercharger; the combination comprising means to control the speed of the turbo-supercharger, a two phase actuator motor to operate said control means, a generator driven by the turbo-supercharger, whereby the voltage and frequency output thereof is directly proportional to the speed of said turbo-supercharger, a first electrical network connected to the output of said generator and to the second phase of said actuator motor including a rectifier, a resistance through which said generator output current passes in proportion to acceleration of the turbo-supercharger, electronic means responsive to a change in rate of fall of potential through said resistance for operating said actuator motor in such a manner as to maintain the rate of acceleration of said supercharger within a predetermined range, a second electrical network connected to the output of said generator and including a filter to pass current at a driven generator speed in excess of a safe maximum allowable speed for said supercharger, a resistance through which said filter output current passes, electronic means responsive to a fall of potential through said resistance for operating said actuator motor in such a manner as to prevent overspeed of the turbo-supercharger.

14. The combination, comprising, a supercharger, a variable speed motor means for driving said supercharger, means for controlling the speed of said motor means, pressure responsive means for maintaining an outlet pressure from said supercharger at a selected value, manually operable means for changing said selected value, acceleration responsive means including a generator driven by said motor means and a rate circuit responsive to rate of change in the output of said generator, said acceleration responsive means further including electronic valve means controlled by said rate circuit and operating said motor control means in such a manner as to maintain the rate of acceleration of said supercharger within a selected range, and means including said manually operable means and said pressure responsive means for varying said selected range and to provide a permissible rate of acceleration proportional to the difference between actual and selected pressure values.

15. The combination, comprising, a variable speed driving member, a generator operably connected to said driving member, whereby the voltage and frequency output of said generator are directly proportional to the speed of said driving member, an electrical network connected to the output of said generator, including a first resistance through which said output current passes, a pair of condensers, one of said condensers being connected at one plate to one end of said first resistance and the other of said condensers being connected at one plate to the other end of said first resistance, a second resistance connected at opposite ends to the other plate of each of said condensers, a pair of electronic valves, each of said electronic valves having a cathode, a plate and a grid for controlling the conductivity between said cathode and plate, the cathode of each of the electronic valves being connected to said second resistance at a point intermediate the opposite ends of said second resistance, the grid of one of said electronic valves being connected at one end of said second resistance and the grid of the other of said electronic valves being connected at the other end of said second resistance, a first winding in the plate circuit of one of said electronic valves, and a second winding in the plate circuit of the other of said electronic valves, whereby upon a change in the speed of said generator there is effected a change in the voltages applied to the one plates of said condensers for effecting a current flow through said second resistance, whereupon the grid of one of said electronic valves effects an increase in the voltage applied through one of said electronic valves to the winding in the plate circuit of said one valve in response to acceleration only of the generator, and the grid of the other electronic valve effects an increase in the voltage applied through the other of said electronic valves to the winding in the plate circuit of said other valve in response to deceleration only of the generator, and means affected by the voltages in said first and second windings for limiting the rate of acceleration and deceleration of the generator by the driving member.

16. The combination, comprising, a variable speed driving member, a generator operably connected to said driving member, whereby the voltage and frequency output of said generator are directly proportional to the speed of said driving member, an electrical network connected to the output of said generator, including a first resistance through which said output current passes, a pair of condensers, one of said condensers being connected at one plate to one end of said first resistance, and other of said condensers being connected at one plate to the other end of said first resistance, a second resistance connected at opposite ends to the other plate of each of said condensers, a pair of electronic valves, each of said electronic valves having a cathode, a plate and a grid for controlling the conductivity between said cathode and plate, the cathode of each of the electronic valves being connected to said second resistance at a point intermediate the opposite ends of the second resistance, the grid of one of said electronic valves being connected at one end of said second resistance and the grid of the other of said electronic valves being connected at the other end of said second resistance, a first winding in the plate circuit of one of said electronic valves, and a second winding in the plate circuit of the other of said electronic valves, whereby upon a change in speed of said generator there is effected a change in the voltages applied to the one plate of said condensers for effecting a current flow through said second resistance, whereupon the grid of one of said electronic valves effects an increase in the voltage applied through one of said electronic valves to the winding in the plate circuit of said one valve in response to acceleration only of the generator, while the grid of the other of said electronic valves effects a decrease in the voltage applied through the other of said electronic valves to the winding in the plate circuit of said other valve in response to acceleration only of said generator, and means responsive to the difference in the voltages applied through said first and second windings for limiting the rate of acceleration of the generator by the driving member.

17. The combination comprising, a variable speed driving member, a generator operably connected to said driving member, whereby the voltage and frequency output of said generator are directly proportional to the speed of said driving member, an electrical network connected to the output of said generator, including a first resistance through which said output current passes, a pair of condensers, one of said condensers being connected at one plate to one end of said first resistance and the other of said condensers being connected at one plate to the other end of said first resistance, a second resistance connected at opposite ends to the other plate of each of said condensers, a pair of electronic valves, each of said electronic valves having a cathode, a plate and a grid for controlling the conductivity between said cathode and plate, the cathode of each of the electronic valves being connected to said second resistance at a point intermediate the opposite ends of the second resistance, the grid of one of said electronic valves being connected at one end of said second resistance and the grid of the other of said electronic valves being connected at the other end of said second resistance, a first winding in the plate circuit of one of said electronic valves and a second winding in the plate circuit of the other of said electronic valves, whereby during only acceleration or deceleration of said generator there is effected a change in the voltages applied to the one plates of said condensers for effecting a current flow through said second resistance, whereupon the grid of one of said electronic valves effect an increase in the voltage applied through one of said electronic valves to the winding in the plate circuit of said one valve in response to the acceleration of the generator, while the grid of the other of said electronic valves effects a decrease in the voltage applied through the other of said electronic valves to the winding in the plate circuit of said other valve in response to the acceleration of said generator, and upon deceleration of said generator the grid of the one electronic valve effects a decrease in the voltage applied through said one valve to the winding in the plate circuit of said one valve, while the grid of the other of said electronic valves effects an increase in the voltage applied through the other of said valves to the winding in the plate circuit of said other valve in response to the deceleration of said generator, and means responsive to the difference in the voltage applied through said first and second windings for maintaining the rate of acceleration and deceleration of the generator within a predetermined limited range.

18. The combination, comprising, a driving member, a generator operably connected to said driving member, whereby the voltage and frequency output of said generator are directly proportional to the speed of said driving member, an electrical network connected to the output of said generator, including a first resistance through which said output current passes, a pair of condensers, one of said condensers being connected at one plate to one end of said first resistance and the other of said condensers being connected at one plate to the other end of said first resistance, a second resistance connected at opposite ends to the other plate of each of said condensers, a pair of electronic valves, each of said electronic valves having a cathode, a plate and a grid for controlling the conductivity between said cathode and plate, the grid of one of said electronic valves being connected at one end of said second resistance and the grid of the other electronic valve being connected at the other end of said second resistance, whereby upon change in the rate of the rotation of the generator there is effected changes in the potential applied at the grids of said electronic valves for varying the conductivity between the plate and cathode of said valves so that upon acceleration of the generator one of said electronic valves passes a control current in excess of the other and upon deceleration of the generator the other electronic valve passes a control current in excess of said one electronic valve, and means operated by said control currents for maintaining the rate of acceleration and deceleration of said generator within a predetermined range.

19. The combination, comprising, a generator, a variable speed driving means for said generator, a reversible electric motor means for controlling the speed of said driving means, and an electrical network connected to the output of said generator, including an electronic means responsive to change in the speed of rotation of said generator and controlling the direction of movement of said motor means to affect said driving means so as to limit the rate of said change in the speed of rotation within a first predetermined range, and other electronic means responsive to rotation of said generator at a speed in excess of a predetermined value and said other electronic means controlling the direction of movement of said motor means to affect said driving means so as to maintain the speed of said generator within a second predetermined range.

20. The combination comprising, a driven member, a source of pulsating electrical energy, means for varying the frequency of said pulsations in direct proportion to the speed of rotation of said driven member, a high pass filter network connected to the output of said source and arranged to pass a control current from said source at a predetermined high frequency indicative of a maximum allowable speed of said driven member, another output circuit from said source, a resistor connected across the output of said second circuit, an electronic valve means, and means responsive to the fall of potential through said resistor for controlling said electronic valve means in response to the rate of change in the speed of said driven member so as to pass a control current in one direction upon the rate of change in speed increasing and a control current in an opposite direction upon the rate of change in speed decreasing, and means operated by said control currents for maintaining the speed of said driven member within a predetermined maximum limit and the rate of change in the speed of said driven member within predetermined limits.

21. The combination comprising, a driven member, a source of pulsating electrical energy, means for varying the frequency of said pulsations in direct proportion to the speed of rotation of said driven member, a high pass filter network connected to the output of said source at a predetermined high frequency indicative of a maximum allowable speed of said driven member, an electronic valve having a plate, a cathode, and a control grid, a second source of electrical energy having a positive terminal and a negative terminal, a voltage dividing resistor connected across the positive and negative terminals of said second source of electrical energy, means including a winding connecting the positive terminal of said electrical energy to the plate, said winding to control the driven speed of said member, means connecting the cathode to said voltage dividing resistor at a point intermediate the opposite ends of said voltage dividing resistor, means connecting the negative terminal of said second source of electrical energy to the control grid so as to apply from said second source of electrical energy a lower potential to said grid than that applied to the cathode and plate for normally opposing electron flow from the cathode to the plate, said last mentioned connecting means including a resistor connected across the output of said filter network and so arranged that passage of current from said first mentioned source of pulsating current through said last mentioned resistor will effect a fall of potential through said last mentioned resistor which will oppose the low potential applied to said grid from said second mentioned source of electrical energy so as to permit electron flow from the cathode to the plate, and said last mentioned connecting means including means supplying a pulsating current having a constant frequency so that the electron flow from the cathode to the plate will pulsate at a constant frequency.

22. For use with an aircraft engine having an induction throttle valve, an engine speed governor, a turbo-supercharger driven by the exhaust gas from the engine, and a waste gate for controlling the speed of the turbo-supercharger; the combination comprising a plurality of amplifier circuits, a master transmitter, a pilot's control lever for controlling said master transmitter, each position of said lever being representative of a desired manifold pressure and a corresponding engine speed, a transformer for said engine speed governor, said governor transformer adapted to measure the position of the lever as a function of the master transmitter and apply voltage through one of said first mentioned amplifier circuits, an actuator motor for controlling said governor and connected to the output of said one amplifier circuit, a governor cam adapted to correlate the governor's position with respect to the position of the master transmitter, manifold pressure responsive means, an engine manifold pressure follow-up transformer adapted to measure the manifold pressure conditions of the engine, inductive coupling means to shift control of said throttle valve from said master transmitter to said pressure follow-up transformer, a polyphase actuator motor for controlling said throttle valve and connected in circuit with said inductive coupling means and adapted to operate from said master transmitter when said inductive coupling means is in one position and from said pressure transformer when said inductive coupling means is in another position, said pressure actuated transformer connected to said master transmitter and being adapted to measure engine manifold pressures and to actuate the polyphase throttle valve actuator motor by applying its voltage output to the variable phase thereof through a second of said amplifier circuits to thereby open said throttle valve to a position for maintaining engine pressure equal to the pilot selected manifold pressure, a throttle valve transformer arranged to be energized and de-energized at predetermined throttle openings, a polyphase actuator motor for controlling said waste-gate and connected to the output of a third one of said amplifier circuits and adapted to function from the throttle valve measuring transformer for rotation in one direction, a transformer adapted to be positioned by said actuator motor until said transformer connected to said waste-gate actuator motor measures a predetermined correlated position of the waste-gate with respect to the position of the throttle valve transformer, said waste-gate transformer being adapted to feed back voltage into said last mentioned third amplifier circuit in opposition to a signal tending to rotate said waste-gate actuator in said one direction and said actuator motor adapted to function from the waste-gate transformer for rotation in another direction when said feed back voltage predominates, a generator driven by said turbo-supercharger, whereby the voltage and frequency output of said generator are directly proportional to the speed of said turbo-supercharger, an electrical network connected to the output of said generator, including a high-pass filter means arranged to pass current at a predetermined high frequency corresponding to a maximum allowable speed of said turbo-supercharger, and means controlled by the current from said filter for inducing a current into said last mentioned amplifier circuit for effecting the operation of said waste-gate actuator motor in a direction for decreasing the speed of said turbo-supercharger to within a permissible range, and changes in the voltage output of said generator being directly proportional to the rate of acceleration of said turbo-supercharger, an electrical network connected to the output of said generator, and means controlled by changes in the voltage output of said generator for inducing a current in said last mentioned amplifier circuit for effecting the operation of said waste-gate actuator motor in a direction for limiting the rate of acceleration of said turbo-supercharger.

23. In combination with an internal combustion engine having a manifold, an induction throttle valve, means responsive to the manifold pressure for operating said throttle valve so as to maintain a selected pressure; a variable speed supercharger, and supercharger speed control means operatively connected to said throttle valve and including means responsive to the position of said throttle valve for affecting the speed of said supercharger, said last mentioned means progressively increasing the speed of said supercharger within its operating range so long as the throttle valve remains in a position above a predetermined open position.

24. In combination with an internal combustion engine having a manifold, an induction throttle valve, means responsive to the manifold pressure for operating said throttle valve so as to maintain a selected pressure; a variable speed supercharger, and supercharger speed control means operatively connected to said throttle valve and including means responsive to the position of said throttle valve for affecting the speed of said supercharger, said last mentioned means progressively decreasing the speed of said supercharger within its operating range so long as the throttle valve remains in a position below a predetermined open position.

25. In combination with an internal combustion engine having a manifold, an induction throttle valve, means responsive to the manifold pressure for operating said throttle valve so as to maintain a selected pressure; a variable speed supercharger, and supercharger speed control means operatively connected to said throttle valve and including means responsive to the position of said throttle valve for affecting the speed of said supercharger, said last mentioned means progressively increasing the speed of said supercharger within its operating range so long as the throttle valve remains in a position above a predetermined open position and progressively decreasing said speed of the supercharger within its operating range so long as the throttle valve remains in a position below a predetermined open position.

26. In combination with an internal combustion engine having a manifold, an induction throttle valve, means responsive to the manifold pressure for operating said throttle valve so as to maintain a selected pressure; a variable speed supercharger, and supercharger speed control means operatively connected to said throttle valve and including means responsive to the position of said throttle valve for affecting the speed of said supercharger, said last mentioned means progressively increasing the speed of said supercharger within its operating limits so long as the throttle valve remains in a position above a predetermined open position and progressively decreasing said speed within its operating limits so long as the throttle valve remains in a position below the predetermined open position, and means for varying the rate of change in the speed of said supercharger in direct relation to the difference between the position of the throttle valve and the predetermined open position aforesaid.

27. The combination with an internal combustion engine having an intake conduit and a throttle valve for controlling flow of combustible mixtures to said intake conduit, of manual means for positioning said valve, automatic means responsive to engine intake pressure for positioning said valve, inductive coupling means operable by the positioning of said manual means for transferring from manual to automatic control, and means responsive to movement of said manual means for adjusting the datum of said automatic means.

28. The combination with an internal combustion engine having an intake conduit and a throttle valve for controlling flow of combustible mixtures to said intake conduit, of manual means for positioning said valve, automatic means responsive to engine intake pressure for positioning said valve, inductive coupling means for transferring from manual to automatic control, and means responsive to movement of said manual means for adjusting the datum of said automatic means.

29. In combination, an internal combustion engine, means for controlling the fuel supply thereto, a hand lever for positioning said means, automatic means responsive to changes in an operating condition of the engine for positioning said means, and inductive coupling means operable by the positioning of said hand lever for operably connecting the automatic means to said hand lever for adjusting the datum of said automatic means.

30. In combination, an internal combustion engine, means for controlling the fuel supply thereto, a hand lever for positioning said means, automatic means responsive to changes in an operating condition of the engine for positioning said means, and inductive coupling means for operably connecting the automatic means to said hand lever for adjusting the setting of said automatic means.

31. An internal combustion engine having a fuel regulating means, an automatic control actuated by an operating condition of said engine, adjustable means for varying the setting of said automatic control, a single hand lever, and inductive coupling means connecting the hand lever selectively to said adjustable means and the fuel regulating means whereby means of the hand lever the fuel regulating means and the adjustable means may be independently controlled.

32. An internal combustion engine having a throttle valve for regulating the fuel supply thereto, automatic means responsive to intake manifold pressure for positioning said throttle valve, adjustable means for setting said automatic means for a desired intake manifold pressure, a single hand lever, and inductive coupling means for operably connecting it to said throttle valve and to said adjustable means for independently positioning said throttle valve and setting means.

33. An internal combustion engine having a throttle valve for regulating the fuel supply thereto, a motor for positioning the throttle valve, a pressure responsive device, means for setting it for a desired pressure, means connecting the pressure responsive device to said motor to effect adjustment of said throttle valve in response to changes in the pressure applied to said pressure responsive device, a hand lever, and inductive coupling means for operably connecting said hand lever to said motor and to said setting means for independently positioning said throttle and setting means.

34. A control for a throttle of an internal combustion engine, comprising an electrically operated actuator for said throttle, a master electrical control, means for operably connecting the master control to said throttle actuator, a pressure responsive electrical control connected to said master control and to said throttle actuator by said last mentioned connecting means, including inductive coupling means in said connecting means to effect operation of said throttle actuator from said pressure responsive control and said master control.

35. In an electric control for supercharged aircraft engines comprising a manually operable pilot control master transmitter, an engine manifold pressure responsive control device, and a throttle for the engine; the combination of an induction coupling means, said coupling means including a first member including a single phase winding and a second member including two windings of different phase, means for electrically connecting one of said second member windings to said master transmitter, means for electrically connecting the other of said second member windings to said engine manifold pressure responsive control device, an actuator motor for positioning said throttle, said motor connected in circuit with the winding of the first member, and means drivingly connecting said motor to one of said members for positioning said one member in relation to the other member so as to inductively couple the winding of the first member with one or the other of the windings of the second member for controlling said motor means alternately by said master transmitter or said pressure responsive control device.

36. For use with a variable speed supercharger; the combination comprising a reversible motor means for controlling the speed of said supercharger, a generator, means drivingly connecting the generator and supercharger, whereby the voltage and frequency output of the generator is directly proportional to the speed of said supercharger, and electronic means including a rate circuit connected in the generator output and controlling said reversible motor control means so as to limit the rate of acceleration and deceleration of said variable speed supercharger.

37. For use in a system having a variable speed supercharger, power means to drive said supercharger, reversible motor means for controlling the speed of said supercharger, and a generator driven by said power means so that the voltage and frequency output of said generator are directly proportional to the speed of the supercharger; the improvement comprising a rate circuit for connection to the output of said generator, electronic valve means controlled by said last mentioned circuit in response to rate of change in the output of said generator, another circuit to control direction of operation of said reversible motor means, said other circuit including said electronic valve means, and said other circuit controlled by said rate circuit through said electronic valve means to cause operation of the reversible motor means to limit rate of acceleration and rate of deceleration in the speed of said supercharger.

38. Control apparatus for supercharged internal combustion aircraft engines, comprising a throttle valve movable to different positions to control the pressure in the engine intake, means for selecting a pressure to be maintained, means controlled by the intake pressure for automatically moving the throttle so as to maintain any selected pressure during operation of the aircraft at different altitudes, a supercharger for said engine, means for driving said supercharger at any desired speed between minimum and maximum limits, means for controlling the supercharger speed, a movable member and means operated thereby for actuating the speed controlling means of the supercharger, means operated by the throttle operating mechanism as the throttle is moved thereby to a predetermined open position for moving said member to the required position to cause operation of the supercharger at the speed necessary to maintain the selected pressure at the altitude at which the aircraft is operating when said movement of the throttle is effected and means for preventing overspeeding of the supercharger when its speed is increased.

39. A control system for an engine having an air intake passage, a valve in said passage, and means other than said valve for varying an operating condition of said engine indicative of its torque output; said system comprising mechanism for automatically positioning said valve in response to changes in said condition; and means automatically operable in response to operation of said mechanism effecting opening movement of said valve beyond a predetermined range of its movement adjacent to its full open position for also effecting torque increasing adjustment of said first mentioned means and automatically operable in response to operation of said mechanism effecting closing movement of said valve beyond said range for also effecting torque decreasing adjustment of said first mentioned means.

40. A control system for an engine having an air intake passage, a valve in said passage, and a variable speed supercharger operable to compress the air supplied through said passage; said system comprising mechanism for automatically positioning said valve; and means automatically operable in response to operation of said mechanism effecting opening movement of said valve beyond a predetermined range of its movement adjacent to its full open position for also effecting an increase in the speed of said supercharger and automatically operable in response to operation of said mechanism effecting closing movement of said valve beyond said range for also effecting a decrease in the speed of said supercharger.

41. A control system for an engine having an air intake passage, a valve in said passage, and a variable speed supercharger operable to compress the air supplied through said passage; said system comprising mechanism responsive to an increase or decrease in the pressure of the engine intake air for effecting a closing or opening adjustment, respectively, of said valve; and means automatically operable only in response to operation of said mechanism effecting opening movement of said valve beyond a predetermined range of its movement adjacent to its full open position for also effecting an increase in the speed of said supercharger and automatically operable only in response to operation of said mechanism effecting closing movement of said valve beyond said range for also effecting a decrease in the speed of said supercharger.

42. A control system for an engine as recited in claim 41 and including a turbine arranged to be driven by the engine exhaust gases and drivably connected to said supercharger and in which control system said automatically operable means includes an exhaust gas valve for varying the speed of said turbine.

43. A control system for an engine having an air intake passage, a valve in said passage, and a variable speed supercharger operable to compress the air supplied through said passage; said system comprising mechanism responsive to a condition of said engine indicative of its torque output for effecting a closing or opening adjustment of said valve with increase or decrease, respectively, of said torque; and means automatically operable only in response to operation of said mechanism effecting opening movement of said valve beyond a predetermined range of its movement adjacent to its full open position for also effecting an increase in the speed of said supercharger and automatically operable only in response to operation of said mechanism effecting closing movement of said valve beyond said range for also effecting a decrease in the speed of said supercharger.

44. A control system for an engine having an air intake passage, a valve in said passage, a supercharger operable to compress the air supplied through said passage, and means operable for varying the speed of said supercharger relative to that of said engine; said system comprising mechanism responsive to an increase or decrease in the pressure of the engine intake air for effecting a closing or opening adjustment, respectively, of said valve; and means automatically operable in response to operation of said mechanism effecting opening movement of said valve beyond a predetermined range of its movement adjacent to its full open position for also effecting operation of said speed varying means at a rate dependent on the magnitude of said opening movement and in a direction for increasing the speed of said supercharger and automatically operable in response to operation of said mechanism effecting closing movement of said valve beyond said range for also effecting operation of said speed varying means at a rate dependent on the magnitude of said closing movement and in a direction for decreasing the speed of said supercharger.

References Cited in the file of this patent

UNITED STATES PATENTS

| | | |
|---|---|---|
| 1,552,781 | Von Arco | Sept. 8, 1925 |
| 1,563,140 | Von Arco | Nov. 24, 1925 |
| 1,647,192 | Nyquist | Nov. 1, 1927 |
| 1,966,910 | Sparks | July 17, 1934 |
| 2,025,583 | Fitzgerald et al. | Dec. 24, 1935 |
| 2,071,759 | Minorsky | Feb. 23, 1937 |
| 2,115,485 | Dodson | Apr. 26, 1938 |
| 2,184,576 | Beyerle | Dec. 26, 1939 |
| 2,217,364 | Halford et al. | Oct. 8, 1940 |
| 2,284,649 | Grabau | June 2, 1942 |
| 2,289,301 | Barber | July 7, 1942 |
| 2,292,136 | Lindsay et al. | Aug. 4, 1942 |
| 2,297,235 | Muller | Sept. 29, 1942 |
| 2,305,810 | Muller | Dec. 22, 1942 |
| 2,311,642 | Crane et al. | Feb. 23, 1943 |
| 2,312,464 | Ziebolz | Mar. 2, 1943 |
| 2,336,844 | Buck | Dec. 14, 1943 |
| 2,355,759 | Stokes | Aug. 15, 1944 |
| 2,358,363 | Truesdell | Sept. 19, 1944 |
| 2,372,989 | Udale | Apr. 3, 1945 |
| 2,374,708 | Shoults | May 1, 1945 |
| 2,376,142 | Hoffman et al. | May 15, 1945 |
| 2,384,353 | Stieglitz | Sept. 4, 1945 |
| 2,388,350 | Taylor | Nov. 6, 1945 |
| 2,396,618 | Stieglitz | Mar. 12, 1946 |
| 2,399,695 | Satterlee | May 7, 1946 |
| 2,400,307 | Hobbs et al. | May 14, 1946 |
| 2,402,885 | Gilfillan et al. | June 25, 1946 |
| 2,403,616 | Sanders, Jr. | July 9, 1946 |
| 2,405,309 | Jorgensen et al. | Aug. 6, 1946 |
| 2,408,699 | Sparrow | Oct. 1, 1946 |
| 2,423,417 | Stokes | July 1, 1947 |